United States Patent
Weathers et al.

(10) Patent No.: US 12,531,967 B2
(45) Date of Patent: Jan. 20, 2026

(54) CANINE INSPECTION RECORDING

(71) Applicant: Michael Stapleton Associates, Ltd., New York, NY (US)

(72) Inventors: Marc Weathers, Mahopac, NY (US); Tamer Nasr, Piscataway, NJ (US); Ahmad Eied, Cary, NC (US); Paul Bender, Clayton, NC (US)

(73) Assignee: Michael Stapleton Associates, Ltd., New York, NY (US)

( * ) Notice: Subject to any disclaimer, the term of this patent is extended or adjusted under 35 U.S.C. 154(b) by 56 days.

(21) Appl. No.: 18/565,887

(22) PCT Filed: Jun. 1, 2022

(86) PCT No.: PCT/US2022/031758
§ 371 (c)(1),
(2) Date: Nov. 30, 2023

(87) PCT Pub. No.: WO2022/256398
PCT Pub. Date: Dec. 8, 2022

(65) Prior Publication Data
US 2024/0259536 A1     Aug. 1, 2024

Related U.S. Application Data

(60) Provisional application No. 63/195,860, filed on Jun. 2, 2021.

(51) Int. Cl.
| H04N 7/18 | (2006.01) |
| G11B 27/34 | (2006.01) |
| H04N 23/66 | (2023.01) |

(52) U.S. Cl.
CPC ............ *H04N 7/185* (2013.01); *G11B 27/34* (2013.01); *H04N 23/66* (2023.01)

(58) Field of Classification Search
None
See application file for complete search history.

(56) References Cited

U.S. PATENT DOCUMENTS

| 4,775,220 A | 10/1988 | Penkethman |
| 4,816,753 A | 3/1989 | Palkuti |
| 5,181,234 A | 1/1993 | Smith |

(Continued)

FOREIGN PATENT DOCUMENTS

WO    WO 2020246255    12/2020

OTHER PUBLICATIONS

Extended European Search Report in European Appln No. 22816767.2, mailed on Jul. 30, 2024, 7 pages.

(Continued)

*Primary Examiner* — Daniel T Tekle
(74) *Attorney, Agent, or Firm* — Fish & Richardson P.C.

(57) ABSTRACT

A command is transmitted from a mobile computing device to a camera external to the mobile computing device. The command instructs the camera to capture video data of a canine sniff inspection of a parcel. The video data of the canine sniff inspection is obtained at the mobile computing device from the camera. The video data is compressed at the mobile computing device, to obtain compressed video data. The compressed video data is transmitted from the mobile computing device to a remote computing system.

20 Claims, 16 Drawing Sheets

(56) References Cited

U.S. PATENT DOCUMENTS

| | | |
|---|---|---|
| 5,490,196 A | 2/1996 | Rudich et al. |
| 5,491,337 A | 2/1996 | Jenkins et al. |
| 6,094,472 A | 7/2000 | Smith |
| 6,326,615 B1 | 12/2001 | Syage et al. |
| 6,473,487 B1 | 10/2002 | Le |
| 6,542,580 B1 | 4/2003 | Carver et al. |
| 6,606,516 B2 | 8/2003 | Levine |
| 6,653,588 B1 | 11/2003 | Gillard-Hickman |
| 6,665,373 B1 | 12/2003 | Kotowski et al. |
| 6,690,005 B2 | 2/2004 | Jenkins et al. |
| 6,737,642 B2 | 5/2004 | Syage et al. |
| 6,765,198 B2 | 7/2004 | Jenkins et al. |
| 6,812,426 B1 | 11/2004 | Kotowski et al. |
| 6,815,670 B2 | 11/2004 | Jenkins et al. |
| 6,831,273 B2 | 12/2004 | Jenkins et al. |
| 6,839,403 B1 | 1/2005 | Kotowski et al. |
| 6,840,122 B1 | 1/2005 | Jenkins et al. |
| 7,049,814 B2 | 5/2006 | Mann |
| 7,109,714 B2 | 9/2006 | Rudakov et al. |
| 7,110,493 B1 | 9/2006 | Kotowski et al. |
| 7,141,786 B2 | 11/2006 | McGann et al. |
| 7,161,144 B2 | 1/2007 | Syage et al. |
| 7,196,325 B2 | 3/2007 | Syage et al. |
| 7,218,105 B2 | 5/2007 | Chisholm et al. |
| 7,250,763 B2 | 7/2007 | Mikhaltsevitch et al. |
| 7,253,727 B2 | 8/2007 | Jenkins et al. |
| 7,282,913 B2 | 10/2007 | Mikhaltsevitch et al. |
| 7,338,638 B2 | 3/2008 | McGann et al. |
| 7,355,400 B2 | 4/2008 | Mikhaltsevitch et al. |
| 7,401,498 B2 | 7/2008 | Syage et al. |
| 7,456,393 B2 | 11/2008 | Napoli |
| 7,528,367 B2 | 5/2009 | Haigh |
| 7,541,577 B2 | 6/2009 | Davenport et al. |
| 7,594,422 B2 | 9/2009 | Perry et al. |
| 7,594,447 B2 | 9/2009 | Napoli |
| 7,663,099 B2 | 2/2010 | Reda |
| 7,721,588 B2 | 5/2010 | Perry et al. |
| 7,856,898 B2 | 12/2010 | Carey et al. |
| 7,880,137 B2 | 2/2011 | McGann et al. |
| 8,161,830 B2 | 4/2012 | Boudries et al. |
| 8,288,735 B2 | 10/2012 | Syage et al. |
| 8,401,147 B2 | 3/2013 | Ryge et al. |
| 8,402,842 B2 | 3/2013 | Syage et al. |
| 8,471,558 B2 | 6/2013 | Chisholm et al. |
| 8,494,507 B1 * | 7/2013 | Tedesco .............. G09B 21/00 |
| | | 455/418 |
| 8,614,582 B2 | 12/2013 | Syage et al. |
| 8,723,111 B2 | 5/2014 | Syage et al. |
| 8,774,362 B2 | 7/2014 | Hughes |
| 8,781,067 B2 | 7/2014 | Langeveld et al. |
| 8,866,073 B2 | 10/2014 | Goedecke |
| 8,952,327 B2 | 2/2015 | Patterson et al. |
| 9,052,264 B2 | 6/2015 | Bendahan et al. |
| 9,069,101 B2 | 6/2015 | Arroyo, Jr. et al. |
| 9,123,519 B2 | 9/2015 | Bendahan et al. |
| 9,128,198 B2 | 9/2015 | Morton |
| 9,147,565 B1 | 9/2015 | Goedecke |
| 9,158,027 B2 | 10/2015 | Morton |
| 9,207,195 B2 | 12/2015 | Gozani et al. |
| 9,223,050 B2 | 12/2015 | Kaval |
| 9,224,573 B2 | 12/2015 | Langeveld et al. |
| 9,279,901 B2 | 3/2016 | Akery |
| 9,285,498 B2 | 3/2016 | Carver et al. |
| 9,291,741 B2 | 3/2016 | Gray et al. |
| 9,310,322 B2 | 4/2016 | Panesar et al. |
| 9,316,760 B2 | 4/2016 | Bendahan |
| 9,329,285 B2 | 5/2016 | Gozani et al. |
| 9,354,153 B2 | 5/2016 | Syage et al. |
| 9,404,875 B2 | 8/2016 | Langeveld |
| 9,420,677 B2 | 8/2016 | Morton et al. |
| 9,429,530 B2 | 8/2016 | Morton |
| 9,435,752 B2 | 9/2016 | Morton et al. |
| 9,442,213 B2 | 9/2016 | Bendahan et al. |
| 9,465,135 B2 | 10/2016 | Morton |
| 9,482,655 B2 | 11/2016 | Vilkov et al. |
| 9,528,969 B2 | 12/2016 | Shaw et al. |
| 9,557,427 B2 | 1/2017 | Bendahan et al. |
| 9,625,606 B2 | 4/2017 | Bendahan et al. |
| 9,646,811 B2 | 5/2017 | Kaye et al. |
| 9,685,190 B1 * | 6/2017 | Fishkin ............ H04N 21/4788 |
| 9,688,517 B2 | 6/2017 | Morton |
| 9,726,655 B2 | 8/2017 | Syage et al. |
| 9,766,218 B2 | 9/2017 | Lai et al. |
| 9,772,426 B2 | 9/2017 | Armistead, Jr. et al. |
| 9,789,434 B1 | 10/2017 | Lai et al. |
| 9,870,150 B2 | 1/2018 | Liu et al. |
| 9,880,314 B2 | 1/2018 | Pfander et al. |
| 10,021,350 B2 | 7/2018 | Rayner |
| 10,098,214 B2 | 10/2018 | Morton |
| 10,107,783 B2 | 10/2018 | Lionheart et al. |
| 10,141,173 B2 | 11/2018 | Syage |
| 10,345,479 B2 | 7/2019 | Langeveld et al. |
| 10,386,504 B2 | 8/2019 | Bendahan et al. |
| 10,578,752 B2 | 3/2020 | Morton |
| 10,585,206 B2 | 3/2020 | Bendahan |
| 10,598,812 B2 | 3/2020 | Franco et al. |
| 10,600,609 B2 | 3/2020 | Bendahan et al. |
| 10,641,686 B2 | 5/2020 | Bilodeau et al. |
| 10,663,616 B2 | 5/2020 | Morton |
| 10,665,446 B2 | 5/2020 | Verkerk et al. |
| 10,670,769 B2 | 6/2020 | Morton et al. |
| 10,698,128 B2 | 6/2020 | Morton |
| 10,707,063 B2 | 7/2020 | Schmidt et al. |
| 10,713,914 B2 | 7/2020 | Jarvi et al. |
| 10,739,852 B2 * | 8/2020 | Amstutz ............ G08B 21/0288 |
| 10,754,058 B2 | 8/2020 | Morton |
| 10,782,440 B2 | 9/2020 | Hanley |
| 10,816,691 B2 | 10/2020 | Morton |
| 10,830,920 B2 | 11/2020 | Parikh et al. |
| 11,019,298 B2 * | 5/2021 | Galluzzi ............... H04N 7/181 |
| 11,158,348 B1 * | 10/2021 | Warren ............... G11B 27/031 |
| 12,184,930 B1 * | 12/2024 | Gratias ............. H04N 21/8456 |
| 2004/0016271 A1 | 1/2004 | Shah et al. |
| 2007/0229307 A1 * | 10/2007 | Pawlenko ............... G01S 7/412 |
| | | 340/5.1 |
| 2008/0100705 A1 * | 5/2008 | Kister .................... H04N 7/188 |
| | | 348/143 |
| 2009/0121740 A1 * | 5/2009 | Hauke ................... H04H 60/07 |
| | | 326/30 |
| 2009/0138493 A1 * | 5/2009 | Kalaboukis .......... G11B 27/034 |
| 2009/0145369 A1 | 6/2009 | Lumbroso et al. |
| 2010/0158191 A1 | 6/2010 | Gray et al. |
| 2010/0281042 A1 * | 11/2010 | Windes .............. H04N 21/4882 |
| | | 707/769 |
| 2011/0122063 A1 * | 5/2011 | Perlman ............. H04N 21/6125 |
| | | 345/161 |
| 2012/0153168 A1 | 6/2012 | Langeveld |
| 2013/0039157 A1 | 2/2013 | Waites |
| 2013/0201356 A1 * | 8/2013 | Kennedy ............. H04L 63/0823 |
| | | 726/4 |
| 2014/0070944 A1 * | 3/2014 | Lacaze .................... F41H 13/00 |
| | | 340/539.13 |
| 2014/0222402 A1 | 8/2014 | Langeveld et al. |
| 2014/0342631 A1 | 11/2014 | Morton |
| 2015/0154876 A1 | 6/2015 | Modica et al. |
| 2016/0007067 A1 * | 1/2016 | Lai ..................... H04N 21/2743 |
| | | 725/62 |
| 2016/0182850 A1 | 6/2016 | Thompson |
| 2016/0196628 A1 * | 7/2016 | Crowley ............... G06Q 50/265 |
| | | 705/325 |
| 2016/0223706 A1 | 8/2016 | Franco et al. |
| 2016/0242387 A1 * | 8/2016 | Ecker ................... A01K 15/021 |
| 2016/0341847 A1 | 11/2016 | Arroyo, Jr. et al. |
| 2017/0168189 A1 | 6/2017 | Peyton et al. |
| 2017/0213715 A1 | 7/2017 | Davila et al. |
| 2017/0236232 A1 | 8/2017 | Morton |
| 2017/0309463 A1 | 10/2017 | Vilkov |
| 2017/0332601 A1 * | 11/2017 | Brown ................ A01K 15/021 |
| 2018/0128754 A1 | 5/2018 | Thompson et al. |
| 2018/0172635 A1 | 6/2018 | Lai et al. |
| 2018/0172650 A1 | 6/2018 | Platow et al. |
| 2018/0227347 A1 * | 8/2018 | Rombakh ............... G06F 9/452 |
| 2018/0255226 A1 | 9/2018 | Fukuya et al. |

(56) References Cited

U.S. PATENT DOCUMENTS

| | | |
|---|---|---|
| 2018/0283993 A1 | 10/2018 | Shaw et al. |
| 2018/0284066 A1 | 10/2018 | Vilkov et al. |
| 2018/0356320 A1 | 12/2018 | Romanov et al. |
| 2019/0011421 A1 | 1/2019 | Rogers et al. |
| 2019/0046974 A1 | 2/2019 | Meketa et al. |
| 2019/0178821 A1 | 6/2019 | Morton |
| 2019/0204274 A1 | 7/2019 | Eiceman et al. |
| 2019/0243007 A1 | 8/2019 | Coker et al. |
| 2019/0261041 A1* | 8/2019 | Swenson ............... G11B 27/031 |
| 2019/0271679 A1 | 9/2019 | Vilkov et al. |
| 2019/0335241 A1 | 10/2019 | Yamada et al. |
| 2019/0357497 A1* | 11/2019 | Honchariw .......... A01K 15/021 |
| 2019/0361144 A1 | 11/2019 | Morton |
| 2020/0025955 A1 | 1/2020 | Gozani et al. |
| 2020/0103547 A1 | 4/2020 | Morton |
| 2020/0110006 A1 | 4/2020 | Shaw et al. |
| 2020/0116674 A1 | 4/2020 | Rogers et al. |
| 2020/0158711 A1 | 5/2020 | Vilkov et al. |
| 2020/0158860 A1 | 5/2020 | Morton |
| 2020/0158909 A1 | 5/2020 | Morton |
| 2020/0161116 A1 | 5/2020 | Lai et al. |
| 2020/0191991 A1 | 6/2020 | Morton |
| 2020/0286723 A1 | 9/2020 | Eiceman et al. |
| 2020/0355631 A1 | 11/2020 | Yu et al. |
| 2020/0355632 A1 | 11/2020 | Morton |
| 2020/0355842 A1 | 11/2020 | Bendahan et al. |
| 2020/0378907 A1 | 12/2020 | Morton |
| 2020/0386904 A1 | 12/2020 | Morton |
| 2021/0022320 A1* | 1/2021 | Allen .................... A01K 11/008 |
| 2021/0120786 A1* | 4/2021 | Paulus ................... H04N 23/51 |
| 2021/0192220 A1* | 6/2021 | Qu ......................... G06V 20/46 |
| 2021/0251191 A1* | 8/2021 | Lee ......................... A01K 15/02 |
| 2022/0232801 A1* | 7/2022 | Lalumia ............... A01K 15/021 |
| 2023/0318997 A1* | 10/2023 | Rathod ................ H04N 21/254 |
| | | 709/203 |

OTHER PUBLICATIONS

[No Author Listed], "Detection Canine Program Person-Borne IED Initiative," Homeland Security, Mar. 2019, 2 pages.

Gazit et al., "A simple system for the remote detection and analysis of sniffing in explosives detection dogs," Behavior Research Methods, Instruments, & Computers, Feb. 2003, 35(1):82-89.

International Search Report in International Appln. No. PCT/US2022/031758, mailed on Oct. 6, 2022, 6 pages.

* cited by examiner

| | | |
|---|---|---|
| Handler ID | John_Smith | |
| Canine ID | Scooter | |
| Location ID | STL_2 | |
| Session ID | 101721STL443 | |
| Barcodes | 01112, 01113 | ← 602 |
| Parcel count | 3,4 | ← 604 |
| Alarm count | 1 | |
| Alarm parcel | 798765 | ← 606 |
| Alarm memo | Parcel removed for further testing | |
| Unscreened count | 0 | |
| Video IDs | GL0101.mp4, GL0102.mp4 | ← 608 |

CANINE INSPECTION RECORDING

CROSS-REFERENCE TO RELATED APPLICATIONS

This application claims the benefit of U.S. Provisional Application No. 63/195,860, filed on Jun. 2, 2021, the entire contents of which are incorporated herein by reference.

FIELD OF THE DISCLOSURE

The present disclosure relates to canine sniff inspections.

BACKGROUND

Sniffer dogs are trained to use smell to detect dangerous or illicit substances such as explosives, illegal drugs, currency, contraband electronics, and/or undeclared flora or fauna. A typical session of parcel inspection can include sniff inspections of hundreds of parcels and, correspondingly, the generation of a large amount of inspection-related data.

SUMMARY

Some aspects of this disclosure describe a computer-implemented method. In the method, a command is transmitted from a mobile computing device to a camera external to the mobile computing device. The command instructs the camera to capture video data of a canine sniff inspection of a parcel. The video data of the canine sniff inspection is obtained at the mobile computing device from the camera. The video data is compressed at the mobile computing device, to obtain compressed video data. The compressed video is transmitted from the mobile computing device to a remote computing system.

Implementations of this and other methods described in this disclosure can have one or more of at least the following characteristics.

In some implementations, the method includes, at the remote computing system, receiving the compressed video data from the mobile computing device; stripping audio from the compressed video data, to obtain compressed, audio-stripped video data; storing the compressed, audio-stripped video data in a storage of the remote computing system; and deleting the compressed video data from the remote computing system.

In some implementations, the command is transmitted through a first network connection between the mobile computing device and the camera, and the video data is obtained through a second network connection between the mobile computing device and the camera.

In some implementations, the first network connection includes a Bluetooth connection, and the second network connection includes a WiFi network connection.

In some implementations, a WiFi network of the Wifi network connection is generated by the camera.

In some implementations, transmitting the command and compressing the video data are performed, respectively, in distinct threads running on the mobile computing device.

In some implementations, the distinct threads run in respective distinct applications on the mobile computing device.

In some implementations, the method includes obtaining, at the mobile computing device, auxiliary data characterizing the canine sniff inspection; and transmitting, from the mobile computing device to the remote computing system, the auxiliary data and an association between the auxiliary data and the compressed video data.

In some implementations, the auxiliary data includes at least one of: an identifier of the parcel, an identifier of a handler, or an identifier of a sniffer dog.

In some implementations, obtaining the auxiliary data includes capturing, by the mobile computing device, an image of a code associated with the parcel; and extracting, by the mobile computing device, at least some of the auxiliary data from the image of the code.

In some implementations, the method includes inserting, by the mobile computing device, into metadata of the compressed video data, an identifier of the auxiliary data.

In some implementations, inserting the identifier of the auxiliary data includes inserting the identifier of the auxiliary data into a header of the compressed video data.

In some implementations, the method includes, during recording of the video data by a camera, receiving, at the mobile computing device, a user input indicating a detection event; and, in response to receiving the user input, including, in the auxiliary data, an indicator of the detection event.

In some implementations, the method includes, at the remote computing system, generating an inspection log. Generating the inspection log includes identifying a first plurality of fields in the auxiliary data, the first plurality of fields storing a corresponding plurality of values; accessing a stored correspondence between the first plurality of fields in the auxiliary data and a second plurality of fields in the inspection log; and, based on the stored correspondence, filling the second plurality of fields in the inspection log with corresponding values from the first plurality of fields.

In some implementations, the method includes, at the remote computing system, parsing the compressed video data to obtain a recording length of the compressed video data; and including the recording length in the inspection log.

In some implementations, obtaining the video data includes obtaining the video data in a first format and in a second format. The method includes, in response to an input by a user, playing, on the mobile computing device, the video data in the first format. Compressing the video data includes compressing the video data in the second format.

In some implementations, the first format has a lower resolution than the second format.

In some implementations, compressing the video data includes compressing the video data while maintaining at least a specified minimum resolution of the video data.

Implementations according to this disclosure can help to realize one or more advantages. In some implementations, video processing operations can be computationally separated from other operations in order to provide for more steady/reliable performance of the other operations. In some implementations, video is compressed prior to upload, reducing network bandwidth usage. In some implementations, two distinct networks are used for communication between a mobile computing device and a camera, which can result in more convenient device interconnectivity and/or faster and/or more reliable data transfer between devices. In some implementations, different formats of video data are used for different purposes, which can result in improved device processing performance and high-quality stored video.

The details of one or more implementations are set forth in the accompanying drawings and the description below.

Other aspects, features and advantages will be apparent from the description and drawings, and from the claims.

BRIEF DESCRIPTION OF THE DRAWINGS

FIG. 6 is a set of example auxiliary data.

DETAILED DESCRIPTION

This disclosure describes methods and systems for obtaining, transmitting, structuring, and transferring data related to canine sniff inspections. Canine sniff inspections (sometimes referred to as "screenings") are conducted at transit locations (e.g., airports, ports, and shipping centers) of parcels such as boxes, packages, and containers. When a human handler guides a sniffer dog to inspect (screen) the parcels for dangerous and/or illicit substances, various types of data associated with the inspection are generated. For example, a record of the particular sniffer dog and handler performing the inspection, a time at which the inspection is performed, and a video of the screening are relevant data that may be reviewed later to confirm that a proper inspection was conducted. The special technological and regulatory environments associated with canine sniff inspection mean that conventional data processing methods can be insufficient in some cases. Accordingly, as described in this disclosure, data handling structures and methods can provide efficient, reliable acquisition and storage of inspection-related data while adhering to regulatory and other requirements.

Figure 1:
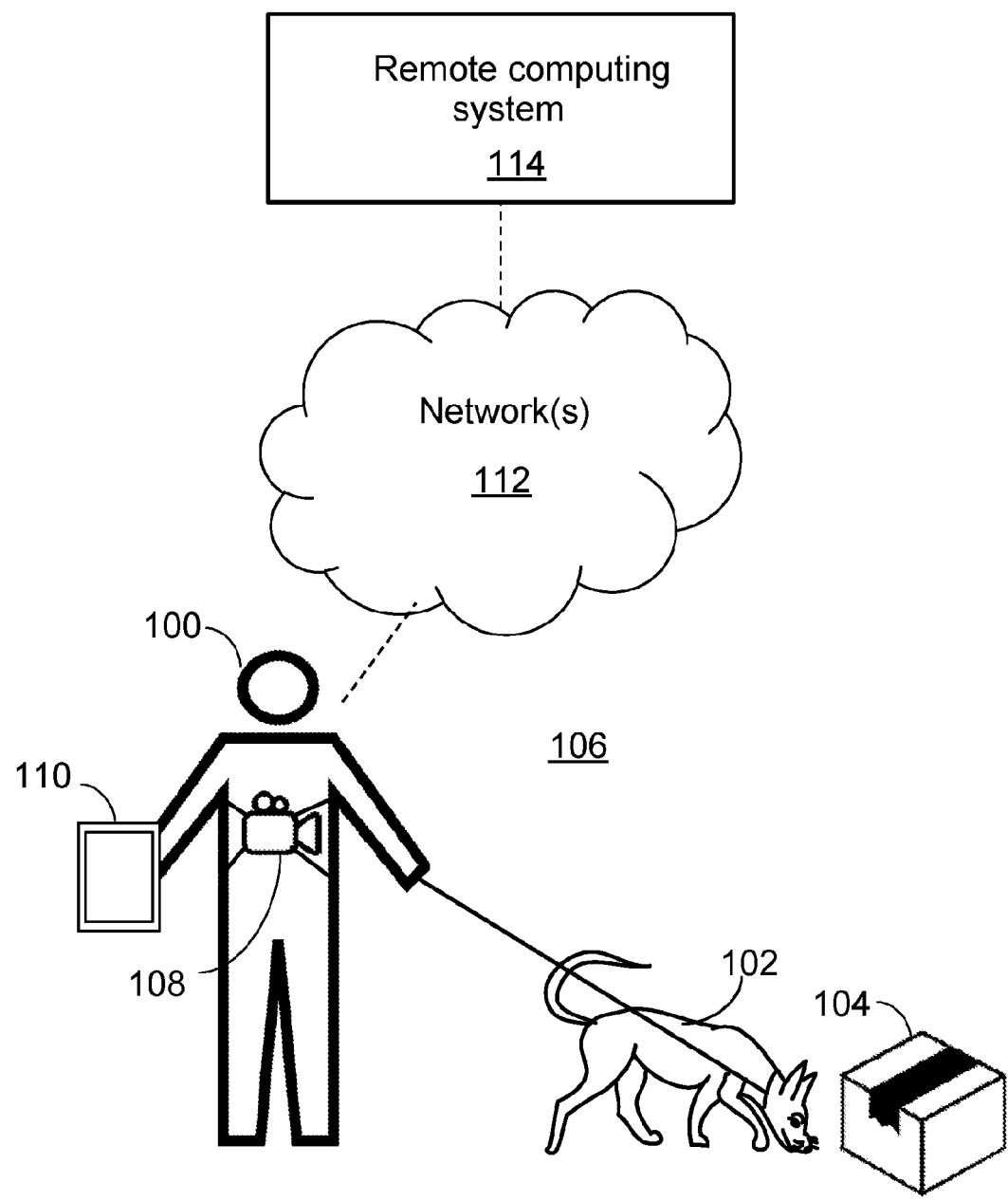
FIG. 1 is a diagram illustrating an example sniff inspection environment.

As shown in FIG. 1, in an example canine sniff inspection, a handler 100 leads a sniffer dog 102 to inspect a parcel 104. The inspection is performed in an environment 106, for example, a warehouse, a port, an airport, a shipping center, a post office, a warehouse, a fulfillment center, and/or another location or facility.

In this example, two user devices are associated with the handler 100. A camera 108 is carried and/or worn by the handler 100 (e.g., in a harness strapped to a front of the handler 100), and, during the inspection, is arranged such that the inspection occurs within a field of view of the camera 108. The handler 100 also carries a mobile computing device 110, such as a tablet, a laptop, a smartphone, or another mobile computing device. The handler can interact with the mobile computing device 110 manually using a touchscreen or other input device. Further details on the hardware and function of the mobile computing device 110 and camera 108 are provided below. In some implementations, the camera 108 is not a separate device but, rather, is integrated into the mobile computing device 110. However, in some cases this can be challenging for the handler 100, because the handler holds the combined camera/mobile computing device 108/110 in a filming position during the inspection and might not be able to perform other operations simultaneously using the combined camera/mobile computing device 108/110. Using separate devices for the camera 108 and the mobile computing device 110 allows the camera 108 to be dedicated to filming inspection, whereas the mobile computing device 110 is reserved for other purposes.

A computing system 114 is remote to the environment 106. For example, in some implementations, the remote computing system 114 includes one or more servers, processors, network switches, and/or other computing components of a cloud-based system such as an Azure cloud computing platform. The remote computing system 114 can be accessed by the camera 108 and/or by the mobile computing device 110 via one or more portals or other access arrangements established at the remote computing system 114.

The camera 108, the mobile computing device 110, and the remote computing system 114 are configured to communicate with one another over one or more networks 112, e.g., using appropriate network interfaces of each device. In various implementations, the networks 122 can include short-range networks such as Bluetooth, near-field, and/or infrared-connected networks; local networks such as local area networks (LANs) and/or WiFi networks (e.g., connected to the Internet and/or local); cellular networks (e.g., an LTE network, a 4G data network, and/or a 5G data network), such as a cellular Internet connection; and/or other network types, such as satellite networks and/or wired/cabled networks. In some implementations, the camera 108, the mobile computing device 110, and the remote computing system 114 are configured to communicate with one another over two or more networks.

Figure 2:
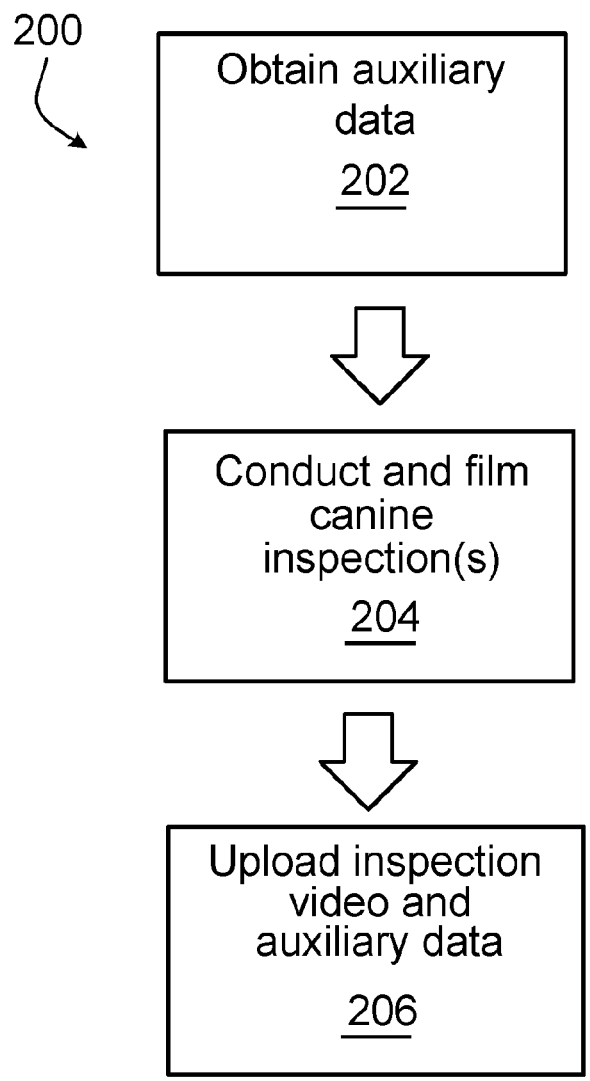
FIG. 2 is a diagram illustrating an example inspection process.

For context, FIG. 2 shows an overview of an example inspection process 200 performed by a handler and sniffer dog using equipment as shown in FIG. 1. In general, handlers may be responsible for receiving parcels, inspecting the parcels, and releasing the parcels, and for proving that the parcels were screened in accordance with protocol. Proof of receiving parcels can be accomplished by uploading information about scanned parcels, e.g., manually entered information and/or scanned information, such as from a manifest document. In some cases, this information is collected in the form of a "transfer certificate" conforming to an established format. Proof of inspection can be accomplished by uploading audio-stripped video of the inspection in association with the other inspection related data, e.g., in association with auxiliary data as described in more detail below. As part of the inspection process 200, the handler obtains auxiliary data related to the inspection (202); conducts and films one or more canine inspections (204), in some cases adding to the auxiliary data in the process; and uploads video of the inspection and the auxiliary data (206).

In some implementations, these and/or other portions of the inspection process are conducted through a guided, interactive process in which a handler makes at least partially step-by-step selections through a series of menus/questions. This guided, interactive process can help ensure that handlers adhere to protocol and regulations, and can help them conduct a complete inspection. Some examples of this process are described with respect to FIGS. 3A-9B; however, in general, the inspection process can include more or fewer steps, other steps, and/or steps performed in an order different from the particular described example.

Figure 3A:
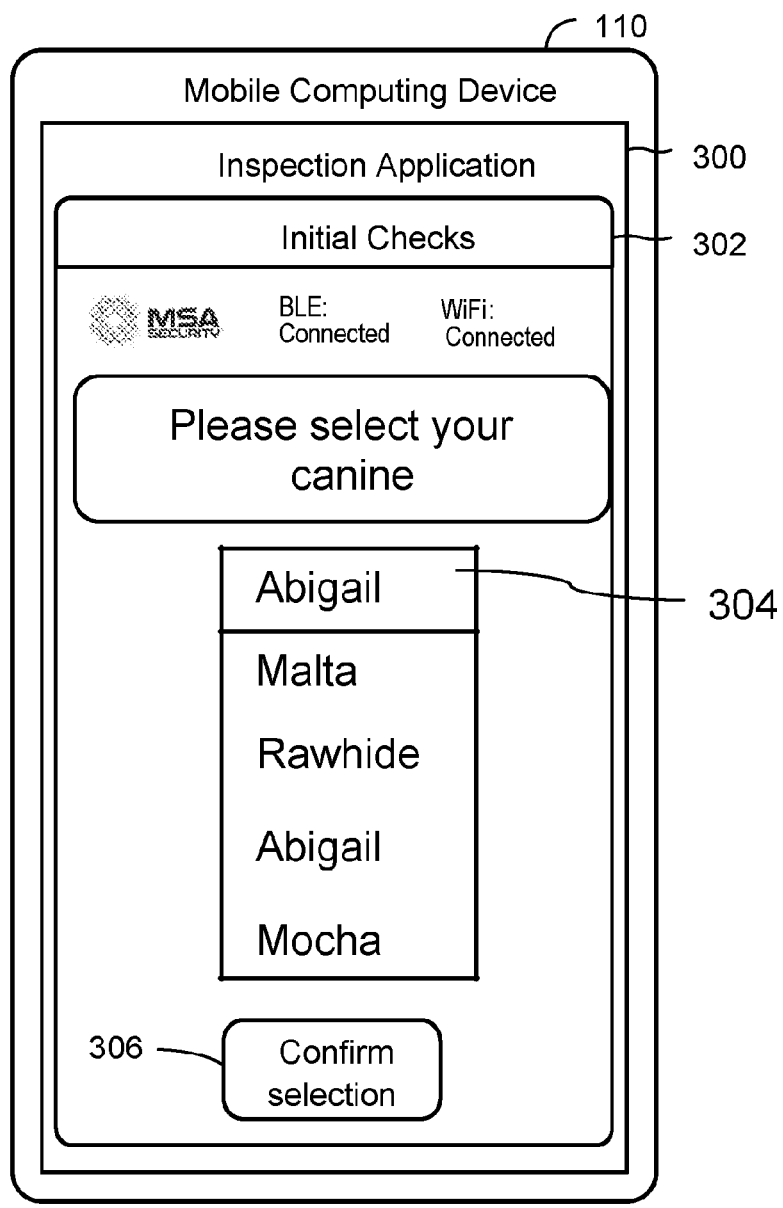
FIGS. 3A-3C are diagrams illustrating example user interfaces for obtaining auxiliary and other data.

In some implementations, as shown in FIG. 3A, at least part of the inspection process is conducted using an inspection application 300 running on the mobile computing device 110. In some implementations, the inspection application 300 is installed on the mobile computing device 110, e.g., as an "app" downloaded from an application marketplace. In some implementations, the inspection application 300 is run by loading a web page on the mobile computing device 110, e.g., using a web browsing application of the mobile computing device 110. In some implementations, a combination of these methods is used, e.g., an installed app that loads at least some of its assets from the Internet on an as-needed basis. The inspection application 300 need not be the only application used by the handler. For example, in some implementations one or more other applications (e.g., a video processing application) are used in conjunction with the inspection application 300 for a complete inspection and data uploading process. The use of multiple applications can provide technical and user-experience benefits, as described in more detail below.

Figure 3B:
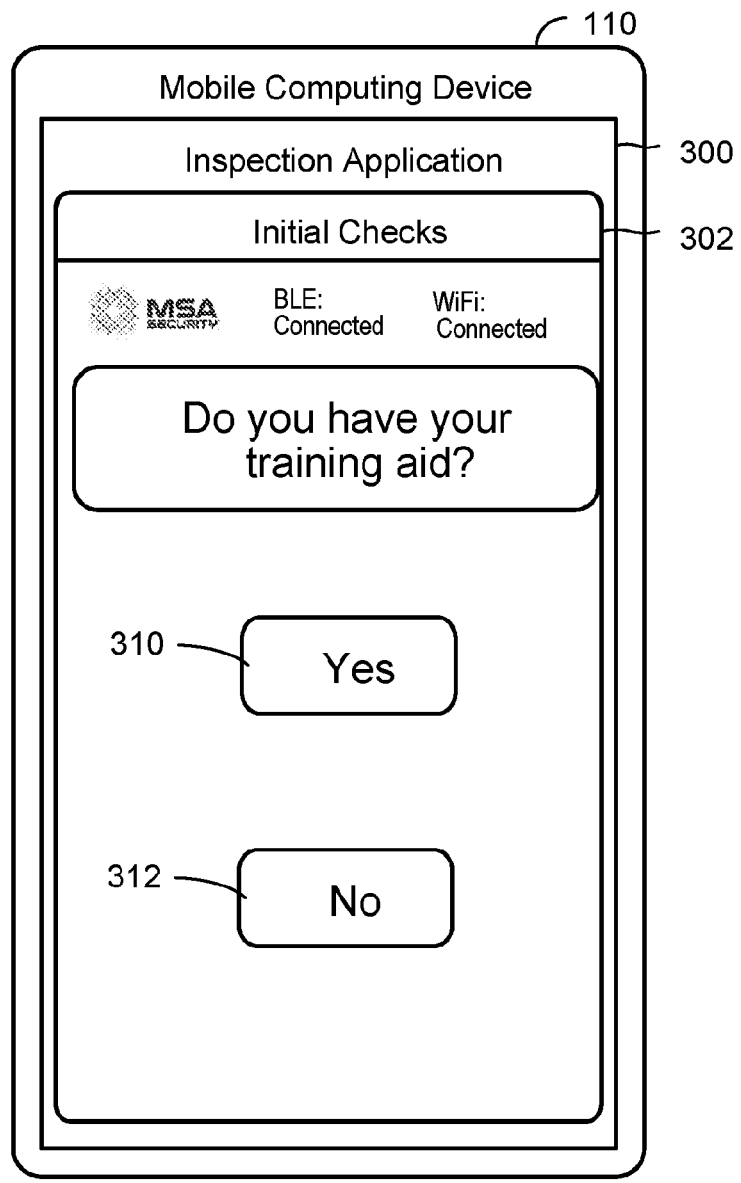
Figure 3C:
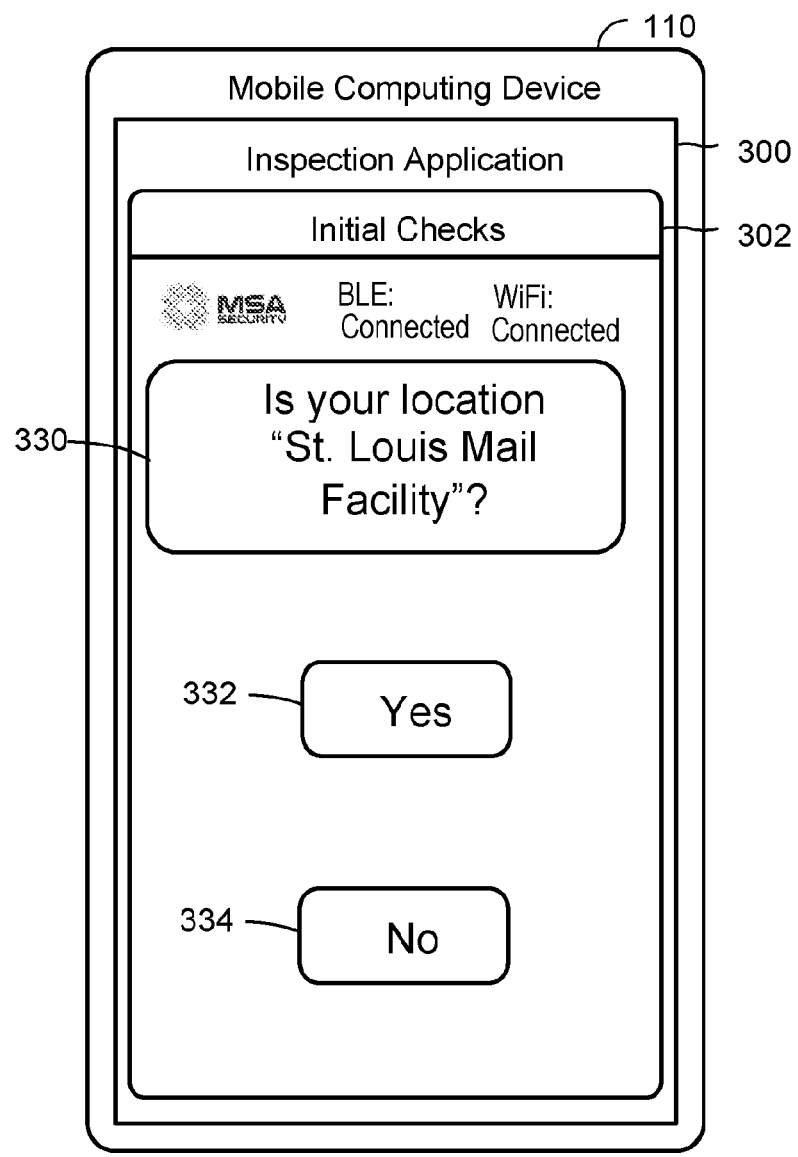

FIGS. 3A-3C show examples of preliminary questions that, in some implementations, a handler is asked to step through at the beginning of each sniff inspection session, before parcel scanning and sniff inspections proper begin. Implementations according to this disclosure are not limited to, nor do they require, these particular questions; other questions can instead or additionally be asked, and, in some implementations, at least some questions can be asked after other parts of the inspection process, such as after manifest scanning and/or after one or more sniff inspections.

As shown in FIG. 3A, in some implementations, on an initial checks user interface 302, the handler is asked to confirm the identity of the sniffer dog, e.g., by using a drop-down menu 304 in conjunction with user interface element 306. The selected sniffer dog data is stored as auxiliary data, which is described in further detail below.

As shown in FIG. 3B, in some implementations, the handler is asked to confirm that he or she is in possession of a training aid, e.g., by selection of user interface element 310 or 312. If the handler selects the "no" interface element 312, in some implementations the inspection application proceeds to subsequent questions that can, for example, seek to confirm the location of the training aid. In some implementations, in order to progress past a training aid confirmation interface such as the one shown in FIG. 3B, the handler is required to use the mobile computing device 110 to scan the training aid (e.g., a barcode or QR code on the training aid) to confirm possession. A training aid is a source of target odor/scent that can be used for continued training of sniffer dogs or for recertification of the sniffer dogs, e.g., to confirm that the sniffer dogs have maintained their effectiveness. It can be important to confirm that handlers are in possession of their training aid at all times. For example, a training aid that is inadvertently lost, such as left behind at an inspection location or left in a parcel in-transit, can trigger detection events by sniffer dogs who subsequently inspect the location or parcel. Retention of the training aid is even more important in the context of "true material" training aids that contain actual explosive agents, the loss of which poses security and other risks. Therefore, to confirm training aid possession, the handler can be required to confirm possession before proceeding to parcel screening.

In some implementations, as shown in FIG. 3C, the handler is asked to confirm the inspection location. In some implementations, data indicating the inspection location is manually input by the handler. In some implementations, the inspection location is selected by the handler from a list of options. In some implementations, the inspection location is determined at least partly automatically by the inspection application 300. For example, the inspection application 300 can query a location service of the mobile computing device 110 (e.g., a GPS module of the mobile computing device 110) to determine a current location of the mobile computing device 110. Next, the mobile computing device 110 can cross-reference the current location with a list of known inspection locations, by at least one of (i) cross-referencing the current location with a list of known inspection locations stored and/or received at the mobile computing device, to determine a matching inspection location, or (ii) sending the current location to remote computing system 114, which, in response, cross-references the current location with a list of known inspection locations stored at the remote computing system 114 and transmits a matching inspection location to the mobile computing device 110.

In the example of FIG. 3C, the inspection location "St. Louis Mail Facility" 330 has been determined by GPS, and the handler is presented with user interface elements 332, 334 by which the handler can confirm or reject this inspection location. For example, if the handler selects user interface element 334, the handler is presented with another user interface by which the handler can manually enter the correct inspection location.

Additional or alternative initial checks that can be performed by provision of appropriate user interface elements can include one or more of: confirming an identity of the handler; confirming possession of supplies besides the training aid (e.g., leash, food pouch with food, toy reward, and/or training aid placard); and/or other types of confirmations, checks, and/or questions.

Figure 4A:
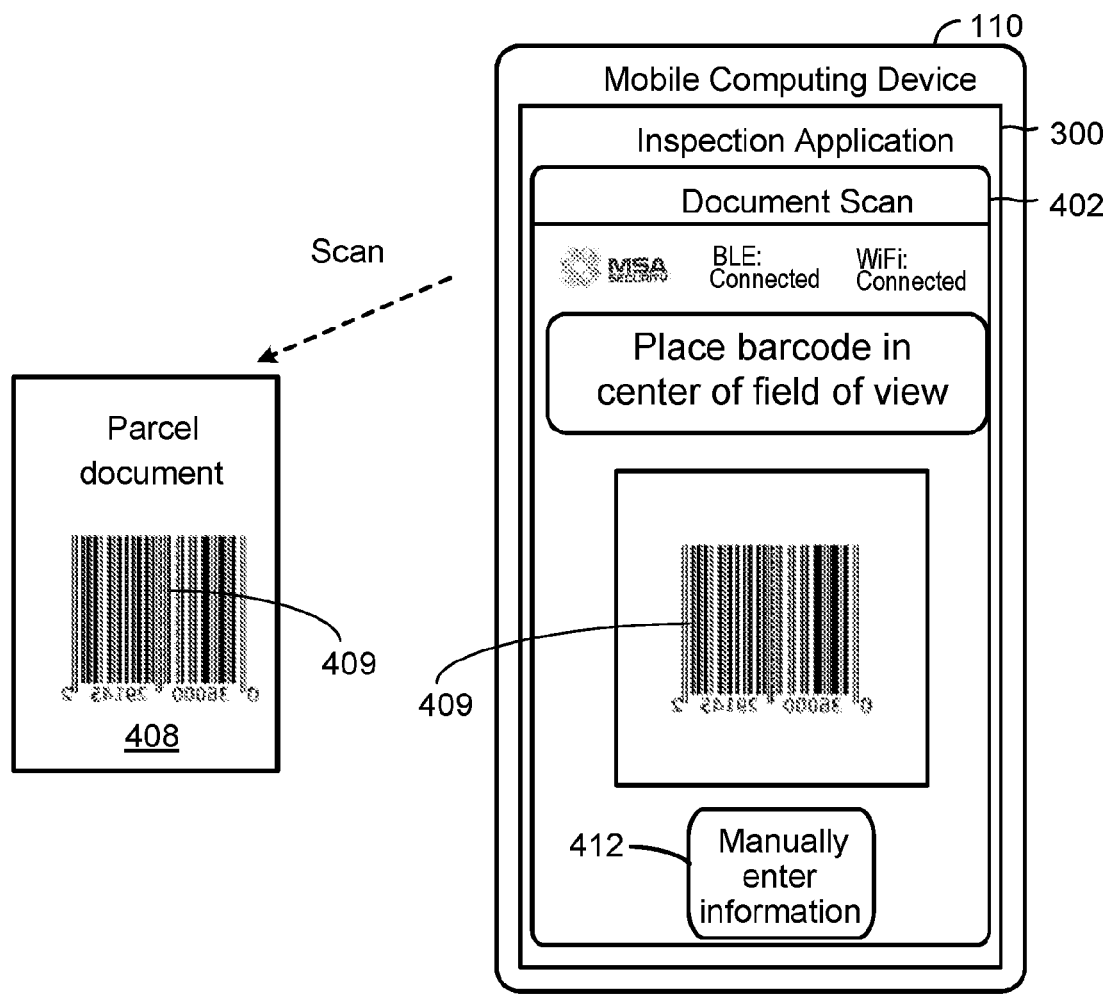
FIGS. 4A-4B are diagrams illustrating example user interfaces for obtaining auxiliary data by scanning.

With initial checks completed, parcels are received (as a formal intake process) using a scanning functionality of the mobile computing device 110. As shown in FIG. 4A, the mobile computing device 110 runs the inspection application 300. The inspection application 300 includes an intake scan user interface 402. Upon prompting by a handler (e.g., by handler 100 selecting a user interface element of the intake scan user interface 402), the inspection application 300 causes a parcel document 408 to be scanned, and auxiliary data is obtained by the inspection application 300 based on the scanning. In some implementations, the parcel document 408 is a printed document, e.g., paper. In some implementations, the parcel document 408 is integrated into a parcel, e.g., printed on a parcel container. In some implementations, the parcel document 408 is displayed on a monitor for scanning. The parcel document 408 can include a shipping manifest with information about parcels to be inspected.

Scanning can be performed in any one of various ways, or in multiple ways, depending on the implementation. In some implementations, the inspection application 300 causes a module of the mobile computing device 110, such as a built-in camera or barcode scanner of the mobile computing device 110, to scan the parcel document 408. In some implementations, the inspection application 400 causes the mobile computing device 110 to send a command to an external camera/scanner (e.g., camera 108) to cause the external camera/scanner to scan the parcel document 408, and results of the scanning (e.g., an image) are received at the mobile computing device 110 from the external camera/scanner.

In some implementations, the parcel document 408 includes a code (e.g., a barcode 409 or a QR code) that contains or points to auxiliary data, e.g., auxiliary data about the shipment to be inspected. For example, the parcel document 408 can directly include the auxiliary data (in encoded and/or plain text form), and/or the parcel document 408 can point to a storage (e.g., a website or location on a server) from which the mobile computing device can retrieve the auxiliary data, for example, over the network 112. Typically (though not necessarily), when the parcel document 408 is a manifest, scanning of the parcel document 408 is sufficient to obtain auxiliary data, for example, directly from the parcel document 408 and/or by retrieval from an external source based on the parcel document 408. When the parcel document 408 is a barcode, data obtained from scanning may be limited, e.g., limited to a shipment ID, and the handler can be requested to input manually other auxiliary data such as a number of parcels included in the shipment. In some cases, the parcel document 408 includes a House Air Waybill (HAWB) issued by a freight sender to a shipper after receipt of a shipment. In some implementations, some or all of the auxiliary data is obtained by scanning text from the parcel document 408 and performing optical character recognition (OCR) to extract the auxiliary data.

"Auxiliary data" refers to data that describes a context of one or more canine sniff inspections and/or that describes the canine sniff inspections themselves and/or results of the canine sniff inspections. Examples of auxiliary data include an identifier (e.g., name or ID) of the inspecting handler; an identifier (e.g., name or ID) of the inspecting sniffer dog; a location of the inspection; a time/date of the inspection; a shipment identifier (e.g., a shipment ID); a number of parcels to be inspected; type(s) of and/or information about the parcels (e.g., sizes of parcels, types of goods contained in the parcels, and other information); destination(s) of the parcels; a number of detection events and/or unscreened parcel events; notes provided by the handler, such as results of detection events; and/or video-identifying data such as video IDs and/or video filenames, among other possible types of auxiliary data. While some of this auxiliary data is parcel/shipment-specific data obtained from the parcel document 408 and/or entered manually, other auxiliary data relates to the handler, such as data provided during the initial checks, and other auxiliary data is obtained based on performance of and/or outcomes of sniff inspections, as described in more detail below.

Figure 4B:
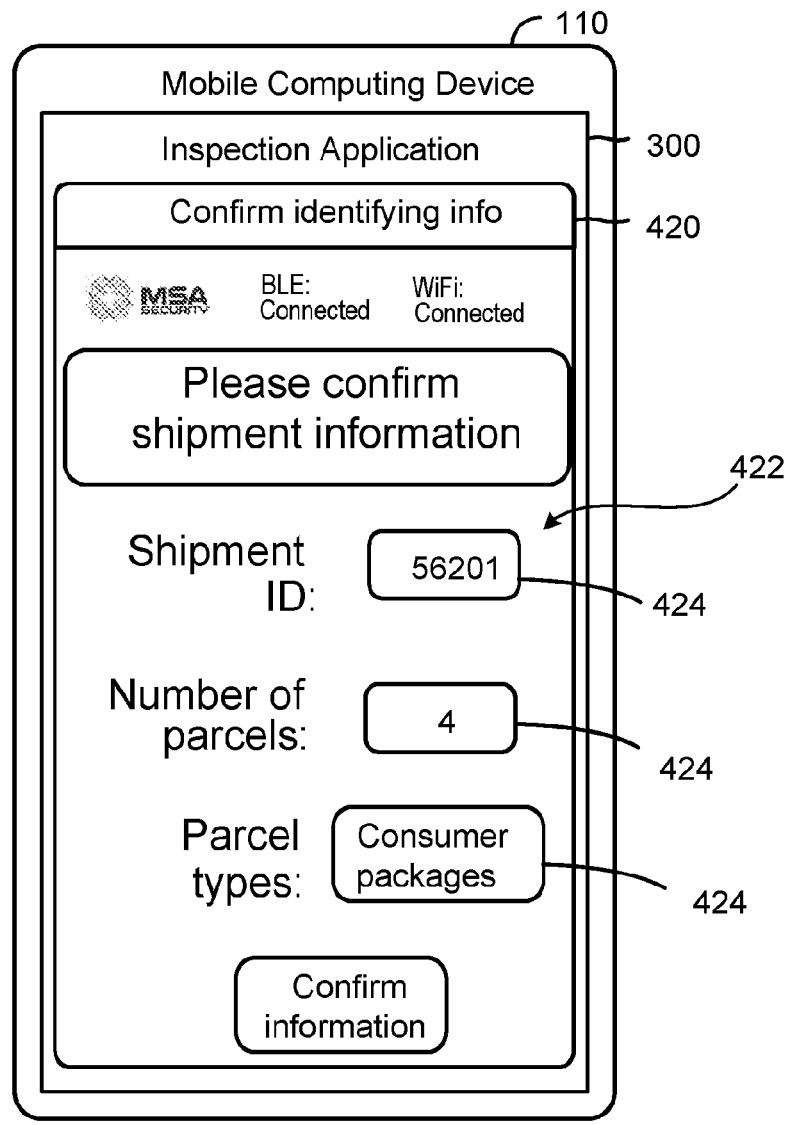

In some implementations, the handler is provided the option (e.g., by selection of interface element 412) to enter manually a value such as a barcode number. Other values, such as a number of parcels associated with a shipment, can instead or additionally be entered manually. As shown in FIG. 4B, in some implementations the inspection application 300 presents an auxiliary data confirmation user interface 420 that lists auxiliary data 422 obtained as a result of scanning. The handler is presented with user interface elements 424 by which the handler can confirm already-present auxiliary data and/or manually update missing and/or incorrect auxiliary data.

In some implementations, parcels scanned in a session correspond to one parcel document (e.g., one shipment of parcels). However, in some implementations, a handler scans multiple parcel documents for, and/or manually enters auxiliary data corresponding to, multiple shipments of parcels, e.g., corresponding to respective bar code numbers, shipment IDs, etc. Auxiliary data for each shipment of parcels is stored on the mobile computing device 110 by the inspection application 300. The handler then can scan the multiple shipments of parcels without needing to enter auxiliary data for each shipment in-between screening sessions; instead, the handler can screen/record the multiple shipments continuously (in some cases with optional pause(s)).

Once preliminary steps are completed, the handler 100 guides the sniffer dog 102 to conduct an inspection of the one or more parcels in the shipment/batch associated with the parcel document 408. For example, the handler leads the sniffer dog to the parcels and instructs the sniffer dog to screen the parcels. The sniffer dog is trained to detect one or more dangerous and/or illegal substances in the parcels. For example, for explosives detection, the sniffer dog can be trained to detect at least one of acetone peroxide, hexamethylene triperoxide diamine, potassium chlorate, ammonium nitrate, or urea nitrate. Items that can instead or additionally be detected during screenings may include, for example, illegal drugs, currency, contraband electronics, flora/fauna, firearms, and/or currency.

Figure 5:
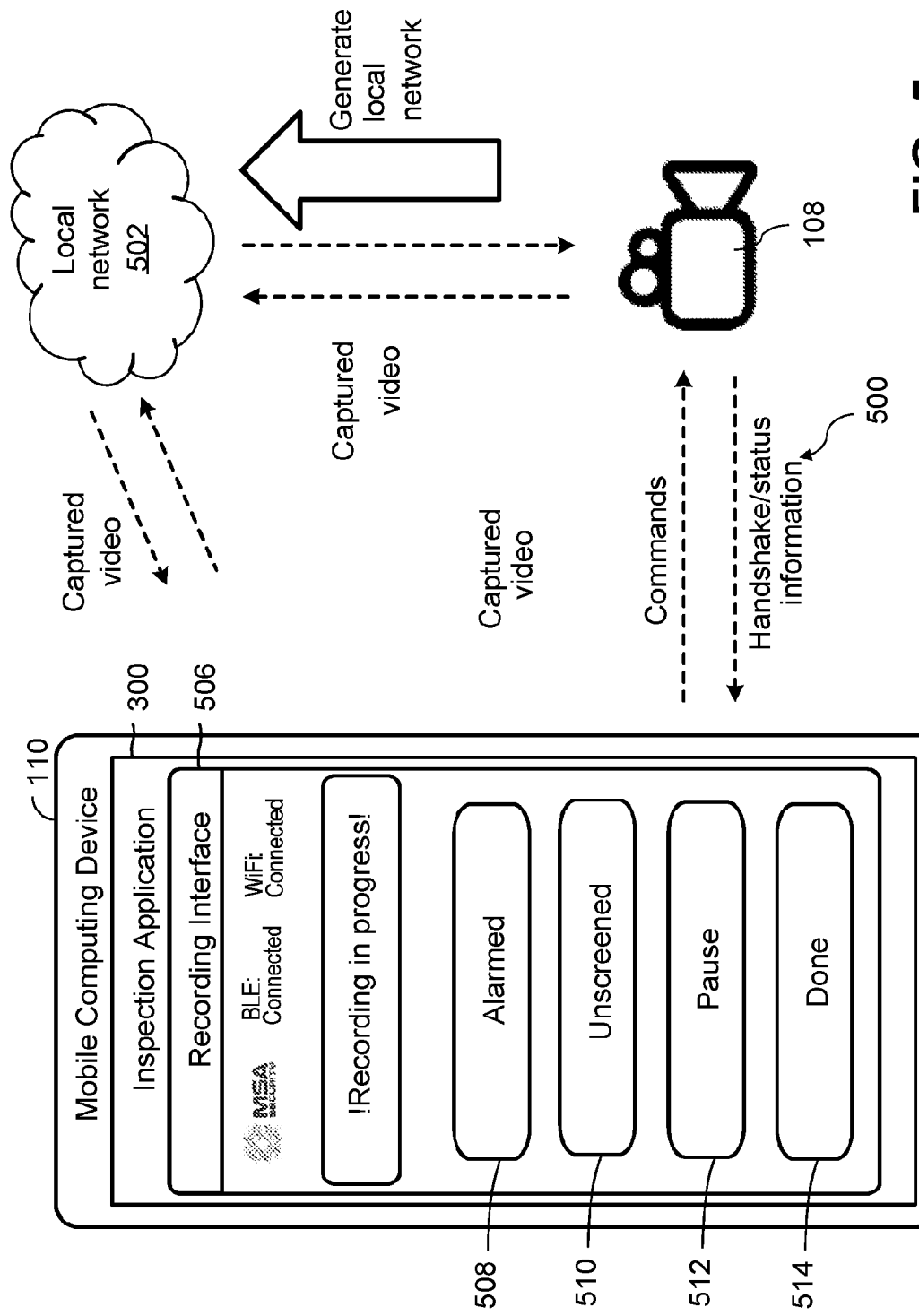
FIG. 5 is a diagram illustrating inter-device communications.

Video of the screening by the sniffer dog 102 is captured by the camera 108, which is communicably coupled to the mobile computing device 110 over one or more networks. An example network configuration is shown in FIG. 5. A short-range network 500 (e.g., a Bluetooth connection) is used by the mobile computing device 110 at least to transmit commands to the camera 108, such as commands to start/stop recording, or commands to use particular acquisition parameters for video recording. For example, the commands can set a recording mode of the camera 108 to a video recording mode; set a resolution of video recording; set a frame rate of video recording; reset or otherwise change a zoom level of the camera 108, such as to widen a field of view; or a combination of these operations. In some implementations, the short-range network 500 is used by the camera 108 to send status and handshake information to the mobile computing device 110.

In some implementations, instead of or in addition to connecting to one another over the short-range network 500, the camera 108 and mobile computing device 110 exchange data via a local network 502. For example, the local network 502 can be a WiFi network. In some implementations, the local network 502 is a local network generated by the camera 108 or the mobile computing device 110, e.g., using a WiFi network creation functionality. In the example of FIG. 5, the camera 108 uses an on-board transceiver to create local network 502, and the mobile computing device 110 connects to the local network 502.

In some implementations, the use of both the short-range network 500 and the local network 502 to transmit data can provide faster, more stable, and/or more convenient device interconnectivity. For example, the short-range network 500 (e.g., a Bluetooth connection) initially can be established between the camera 108 and the mobile computing device 110 in a pairing process (e.g., before the inspection process described herein), and then readily re-established at the inspection location. Alternatively, even if the camera 108 and the mobile computing device 110 have not been paired prior to the inspection process, pairing over the short-range network 500 can be performed conveniently at the inspection location. With the short-range network 500 established, in some implementations handshake/status information is sent over the short-range network 500 to facilitate connection(s) to the local network 502. For example, in some implementations, the camera 108, having established the local network 502, transmits information about the local network 502 (e.g., network ID and/or password) to the mobile computing device 110 over the short-range network 500, which uses the information to join the local network 502. This can decrease the amount of manual entry performed by the handler.

In some implementations, commands are transmitted from the mobile computing device 110 to the camera 108 over the short-range network 500, and videos captured by the camera 108 are transmitted from the camera to the mobile computing device 110 over the local network 502 (e.g., streamed back to the mobile computing device 110, and/or transmitted to the mobile computing device 110 in complete form). This arrangement can provide various benefits. First, in some implementations, establishment of connections via the short-range network 500 is more reliable than establishment of connections via the local network 502. Accordingly, time-sensitive portions of the inspection process, such as camera control, are performed using the short-range network 500 while portions of the inspection process that may be less time-sensitive, such as retrieval of captured video from the camera 108, can be performed using the local network 502. Transmission bandwidth over the local network 502 can be higher than transmission bandwidth over the short-range network 500, and, accordingly videos can be transmitted over the local network 502 for speedier transmission. Command transmissions, in comparison to video transmissions, generally require less bandwidth (e.g., involve transmission of less data), and accordingly the short-range network 500 can be used for transmission of commands.

Video recorded during subsequent screening can be associated with the auxiliary data collected before the screening, e.g., with auxiliary data of one or more shipments of one or more parcels scanned from parcel documents and/or input by the handler. For example, in some implementations, the inspection application 300 stores an association between the auxiliary data and the recorded video, e.g., in a list, a table, and/or in another data structure. In some implementations, as described in more detail below, the inspection application 300 associates the auxiliary data with the video(s) at least in part by storing an identifier from the auxiliary data in a header and/or other metadata of one or more video files of the video(s).

During screening and recording, in some implementations, the handler is presented with a user interface such as the recording interface 506 shown in FIG. 5. In various implementations, the recording interface 506 can include fewer or none of these example functions/interface elements, and/or may include other functions/interface elements. In some implementations, the handler is able to interact with the mobile computing device 110 without disrupting recording of the screenings, because recording is performed by the camera 108 separate from the mobile computing device 110. In this example, the recording interface 506 includes an "alarmed" user interface element 508 that, when selected by the handler, triggers presentation by the inspection application 300 of another interface in which the handler can input information about a detection event by the sniffer dog, e.g., information identifying a specific parcel that was subject to the detection event. The example recording interface 506 also includes an "unscreened" user interface element 510 that, when selected by the handler, triggers presentation by the inspection application 300 of another interface in which the handler can input information about one or more parcels that are not screened (e.g., one or more reasons why the parcels are unable to be screened). Information relating to at least one of detection events or non-screening events can, when applicable, be included in the auxiliary data. In some implementations, video recording is paused when the alarmed user interface element 508 and/or the unscreened user interface element 510 is selected, and recording is subsequently resumed after the handler has entered any relevant information.

The example recording interface 506 also includes a "pause" user interface element 512 that, when selected by the handler, triggers the inspection application 300 to halt recording temporarily (e.g., by the mobile computing device 110 sending a corresponding command to the camera 108) without ending the screening session. After the handler subsequently unpauses (e.g., by selecting an "unpause" user interface element), additional video recording after the pause continues to be associated with the auxiliary data. The example recording interface 506 also includes a "done" user interface element 514 that, when selected by the handler, triggers the inspection application 300 to stop recording (e.g., by the mobile computing device 110 sending a corresponding command to the camera 108) and, in some implementations, triggers the inspection application 300 to cause the camera 108 to transmit captured video(s) to the mobile computing device 110, e.g., over the local network 502.

In some implementations, the recording interface 506 includes one or more user interface elements that allow the handler to associate recorded video segments with particular shipments. For example, in some implementations the recording interface 506 includes a "next set of parcels" user interface element (not shown) that, when selected by the handler, causes subsequently recorded video segment(s) to be associated with a next set of parcels (e.g., with a next barcode in a set of previously-scanned barcodes).

In some implementations, communication between the mobile computing device 110 and the camera 108 is mediated by an application programming interface (API) of the camera 108 running on the mobile computing device 110 in the inspection application 300. The API is configured to convert commands generated by the inspection application 300 into a format compatible with the camera 108, and/or to receive data (e.g., video data) from the mobile computing device 110 and translate the data into a format of the inspection application 300. In some implementations, the API mediates opening and/or closing of communication channels between the mobile computing device 110 and the camera 108, such as the short-range network 500 and/or the local network 502.

In an example screening session, a handler scans two shipment barcodes of two corresponding shipments of three and four parcels, respectively. Auxiliary data of the two shipments is populated automatically in the inspection application 300, and the handler confirms the correctness of the auxiliary data. The handler then initiates recording and begins screening. The sniffer dog indicates a parcel from the first shipment as containing an illicit material. The handler selects "Alarmed," pausing recording. This parcel is removed for further analysis, and the handler uses the inspection application to store information about the inspection event, such as a parcel identifier of the parcel and/or an account of follow-up actions taken; this information is added to the auxiliary data. The handler then resumes recording and finishes screening. At the end of screening, two videos have been recorded, each of which is associated with auxiliary data of the two shipments.

FIG. 6 shows an example of a data structure 600 storing auxiliary data for the foregoing example scenario. Two barcodes 602 are stored in association with a session ID, corresponding to the two shipments screened during the session. Two parcel counts 604 correspond respectively to the shipments. Records 606 are stored of the detection event. Video IDs 608 correspond to stored video of the session. Each video ID 608 need not correspond to a particular shipment but, rather, in some implementations the videos corresponding to the video IDs 608 collectively correspond to the shipments corresponding to the barcodes 602. However, in some implementations auxiliary data storage is performed at least partially on a per-shipment and/or per-video basis. For example, in some implementations a first data structure stores a first set of auxiliary data corresponding to barcode 01112, and a second data structure stores a second set of auxiliary data corresponding to barcode 01113.

Various types of data structure can be used to store the auxiliary data in various implementations. For example, at least one of tables, vectors, structured files (e.g., CSV and/or JSON files), relational databases, and/or portions of these data structures can be used for storing auxiliary data in association with captured video.

In some implementations, captured video in multiple formats is obtained at the mobile computing device 110. For example, a segment of video can be obtained in two formats, such as two or more of .MP4, .MOV, .AVI, or .FLV. In some implementations, the camera 108 generates two or more video files in two or more respective formats and transmits them to the mobile computing device 110, e.g., over the local network 502. In some implementations, the camera 108 provides the mobile computing device 110 with video in a first format, and the inspection application 300 converts the video into one or more other formats. Obtaining video in multiple formats can be useful because the different formats can be better-suited to different respect uses. For example, in some implementations, the inspection application 300 obtains a video segment in .LRV format and in .MP4 format. The .LRV format is lower-resolution video that can be readily played back on the mobile computing device 110 without substantially affecting other operations of the mobile computing device 110, and, accordingly, in some implementations, the inspection application 300 plays recorded video in .LRV format when requested by the handler. This can improve the computational performance of the inspection application 300 because the computational burden of playing the .LRV file is relatively low. The .MP4 format is higher-quality video that is processed at the mobile computing device 110 (as described in further detail below), uploaded to the remote computing system 114, and stored in association with the auxiliary data at the remote computing system 114 for later review.

Figure 7:
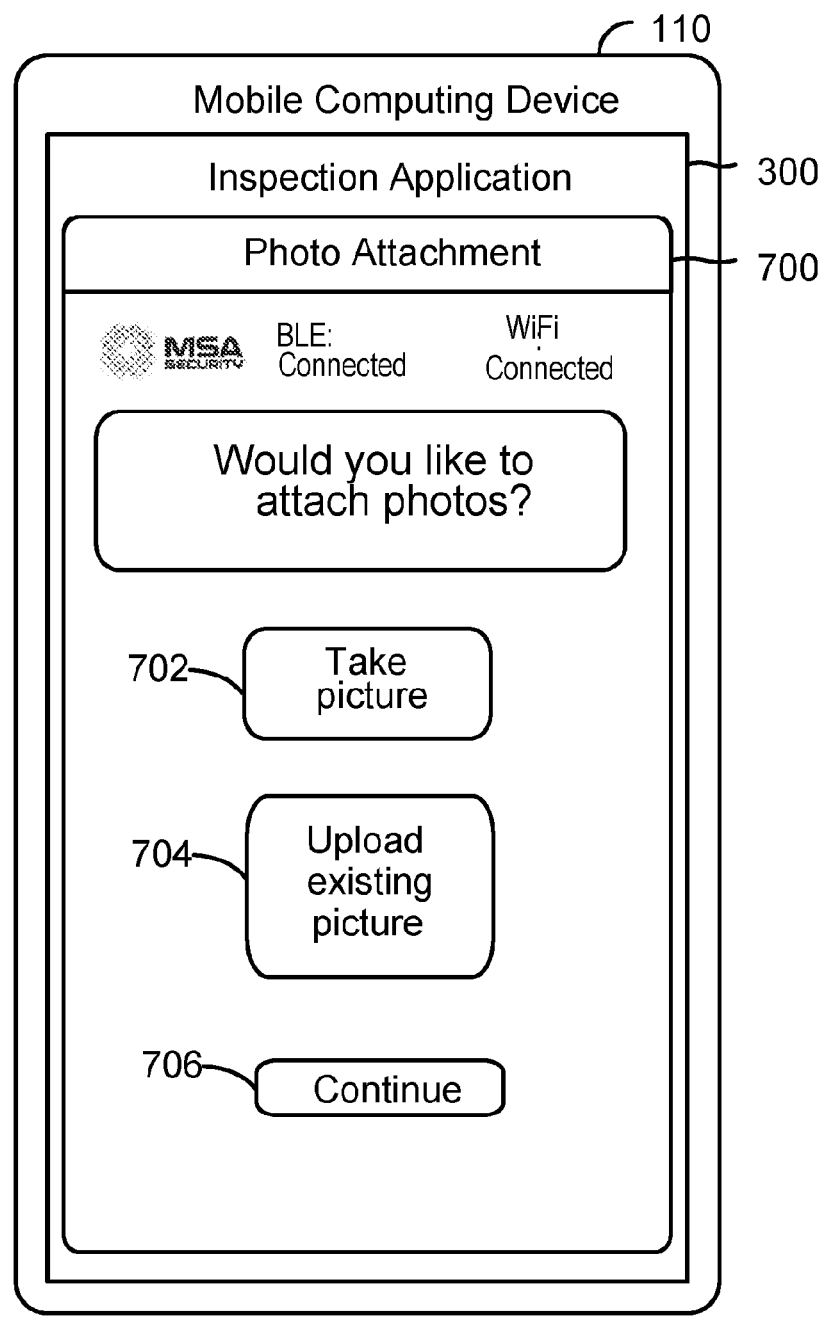
FIG. 7 is a diagram illustrating an example user interface for photo attachment.

In some implementations, besides the previously-described auxiliary data and video data, the inspection application 300 provides the handler with tools to store additional information in association with the auxiliary data and the video data. For example, as shown in FIG. 7, in a photo attachment user interface 700 of the inspection application 300, a "take picture" user interface element 702 allows the handler to take one or more photos (e.g., using a built-in camera of the mobile computing device 110). An "upload existing picture" user interface element 704 allows the handler to upload photos already stored on the mobile computing device 110. The handler also can label a subject of the photos, e.g., "airline manifest," "facility QR code," "priority mail screening exchange info," "amend previously-entered information," or another type of subject. Selection of a "continue" user interface element 706 moves the inspection application 300 to a subsequent interface/mode. Any added images/photos are added to the pre-existing auxiliary data associated with the current screening session.

Videos (e.g., compressed and audio-stripped videos) and associated auxiliary data are uploaded from the mobile computing device 110 to the remote computing system 114, e.g., over a cellular data network. In some implementations, this uploading is a combined uploading, e.g., combined uploading by the inspection application 300 as part of a single process (e.g., in response to a single selection/command by the handler). In some implementations, as described in more detail below, the uploading involves separate uploads. For example, in some implementations auxiliary data is uploaded by the inspection application 300 after each session, and video information is uploaded (i) for multiple sessions in one upload process, or (ii) by a process/application separate from the inspection application 300, or both (i) and (ii).

In some implementations, prior to uploading, video data is processed in one or more ways. For example, in some implementations audio is stripped from the video data; the video data is compressed to a smaller file size; the video data is converted from a first format to a second, different format; or a combination of these processes. Audio stripping can be implemented in order to comply with privacy regulations, which can be government regulations and/or the result of commercial agreements. For example, Transportation Security Administration (TSA) regulations require both that screening videos be stored for later review and that privacy protections be adhered to. Video data may be stored in the remote computing system 114 for at least some period of time, and audio in the video, besides being unnecessary in some cases to prove that complete/correct screening was performed, can represent a privacy risk. Accordingly, the audio can be stripped, and audio-stripped video data can be uploaded.

As noted below, in some implementations audio stripping is performed after upload by the remote computing system 114. In such implementations, description in this disclosure that describes mobile computing device operations performed on compressed, audio-stripped data instead applies to operations performed on compressed data that retains audio.

Compression of the video data can be performed to reduce an amount of network transmission bandwidth used for video uploading, by uploading compressed instead of uncompressed videos. This can be particularly useful in the context of canine sniff inspections, in which cellular network coverage may be unreliable or low-bandwidth. In some implementations, compression is performed so as to maintain a minimum resolution of the compressed video, e.g., 640×480 pixels or 640×640 pixels.

Video format conversion can be performed, for example, in order to convert to a format that is more readily compressed (e.g., compressed using fewer processing and/or memory resources); in order to convert to a format that is more easily audio-stripped (e.g., a format for which audio-stripping uses fewer processing and/or memory resources, and/or a format for which audio-stripping is more readily implemented by software developers); and/or for another reason, such as to convert to a format that is more useful for later review.

As noted above, in some implementations, one or more of these video processing operations (including, e.g., uploading) are performed by the inspection application 300. In other implementations, the video processing operations are performed by a separate application such as a video processing application. In either case, it can be useful to separate computationally performance of some or all of the processes described above (e.g., manifest scanning, receiving/confirming auxiliary data, transmitting camera operation commands to the camera, and/or other operations) from the video processing operations. This can be beneficial because video processing operations, compared to other operations, tend to be the most computationally intensive, e.g., to require the most processor usage, memory usage, and/or network bandwidth usage. Accordingly, computationally combining video processing operations with other operations potentially can slow down the other operations, which may be more time-sensitive. For example, in the context of sniff inspections, screenings are often performed at a rapid pace in demanding environments. Moreover, the devices used to implement screenings (e.g., such as the mobile computing device 110) tend to be optimized for durability and battery longevity, not for processing power. In this context, to computationally combine video processing operations with other operations might slow down the other operations to an unacceptable extent, slowing down inspection location operations such as shipment processing. By computationally separating video processing operations and other operations such as camera command transmission and/or auxiliary data obtaining, a more steady and reliable user experience can be provided for screening. For example, a handler can continue performing further screening sessions, and choose to perform video processing when all screening sessions are concluded, and/or can have video processing performed in the background while continuing to screen.

Figure 8A:
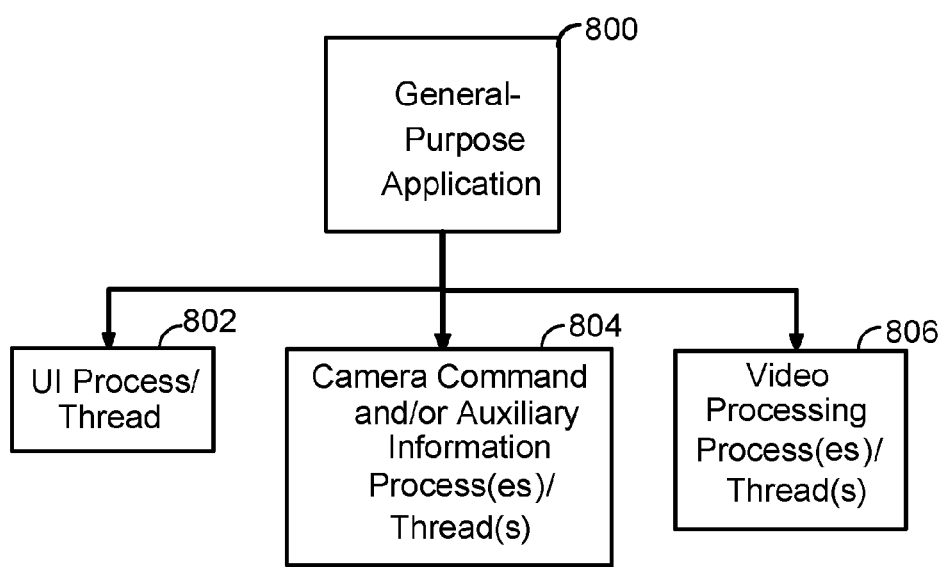
FIGS. 8A-8B are diagrams illustrating example computational separation of operations.

In some implementations, the computational separation is accomplished through the use of separate threads within an overarching application, such as the inspection application 300. For example, as shown in FIG. 8A, a general-purpose application 800 runs three or more sets of one or more threads each. A user interface (UI) thread 802 (sometimes referred to as a "main" thread) manages user interfaces of the general-purpose application 800, e.g., receives and processes handler selections. One or more camera command and/or auxiliary data processing threads 804 perform any or all of the operations described above with respect to the inspection application 300, such as transmitting commands to the camera, scanning inspection documents, obtaining and storing auxiliary data, etc. One or more video processing threads 806 perform one or more video processing operations such as stripping audio from video files, compressing video files, converting video files into other formats, and/or uploading video files to the remote computing system 114. Because the threads 802/804 and 806 are distinct from one another, operations of threads 802/804 are uninhibited or less inhibited by the video processing operations of thread 806. In some implementations, instead of or in addition to being separate threads, the threads 802, 804, 806 represent separate processes being run on the mobile computing device 110.

Figure 8B:
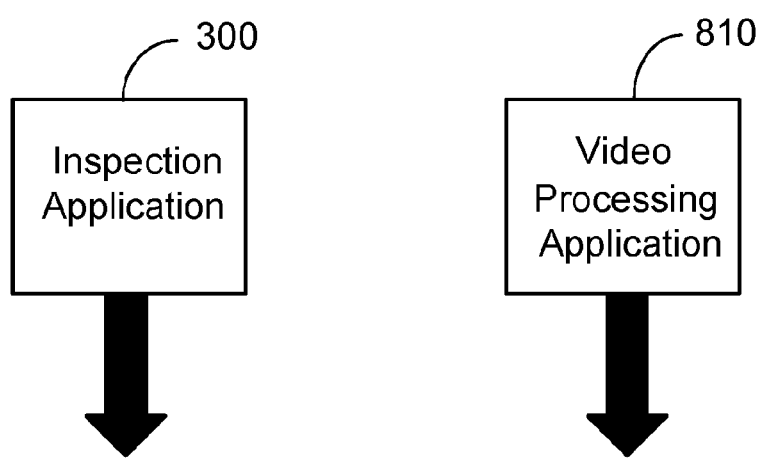

In some implementations, the computational separation is accomplished through the use of separate applications, e.g., separate "apps" installed on the mobile computing device 110. For example, as shown in FIG. 8B, the inspection application 300 performs operations as described above, such as interacting with handlers before and during screenings (e.g., to obtain auxiliary data, including performing scans), transmitting commands to the camera, and, in some implementations, uploading auxiliary data. A video processing application 810 performs one or more video processing operations. In this case, each application 300, 810 runs separate processes and/or threads, and computational separation is achieved such that operations of the inspection application 300 are uninhibited or less inhibited by operations of the video processing application 810.

In some implementations, some or all of the described video processing operations, such as audio removal, compression, and format conversion, are performed by the remote computing system 114 (e.g., instead of by mobile computing device 110). This can reduce the computational burden on the mobile computing device 110 and allow for faster upload. For example, compressed video data can be received at the remote computing system and stripped to obtain compressed, audio-stripped video data. The compressed, audio-stripped video data can then be stored for later review, without storing the compressed video data with sound. For example, the compressed video data can be deleted by the remote computing system 114 after generation of the compressed, audio-stripped video data.

Figures 9A, 9B:
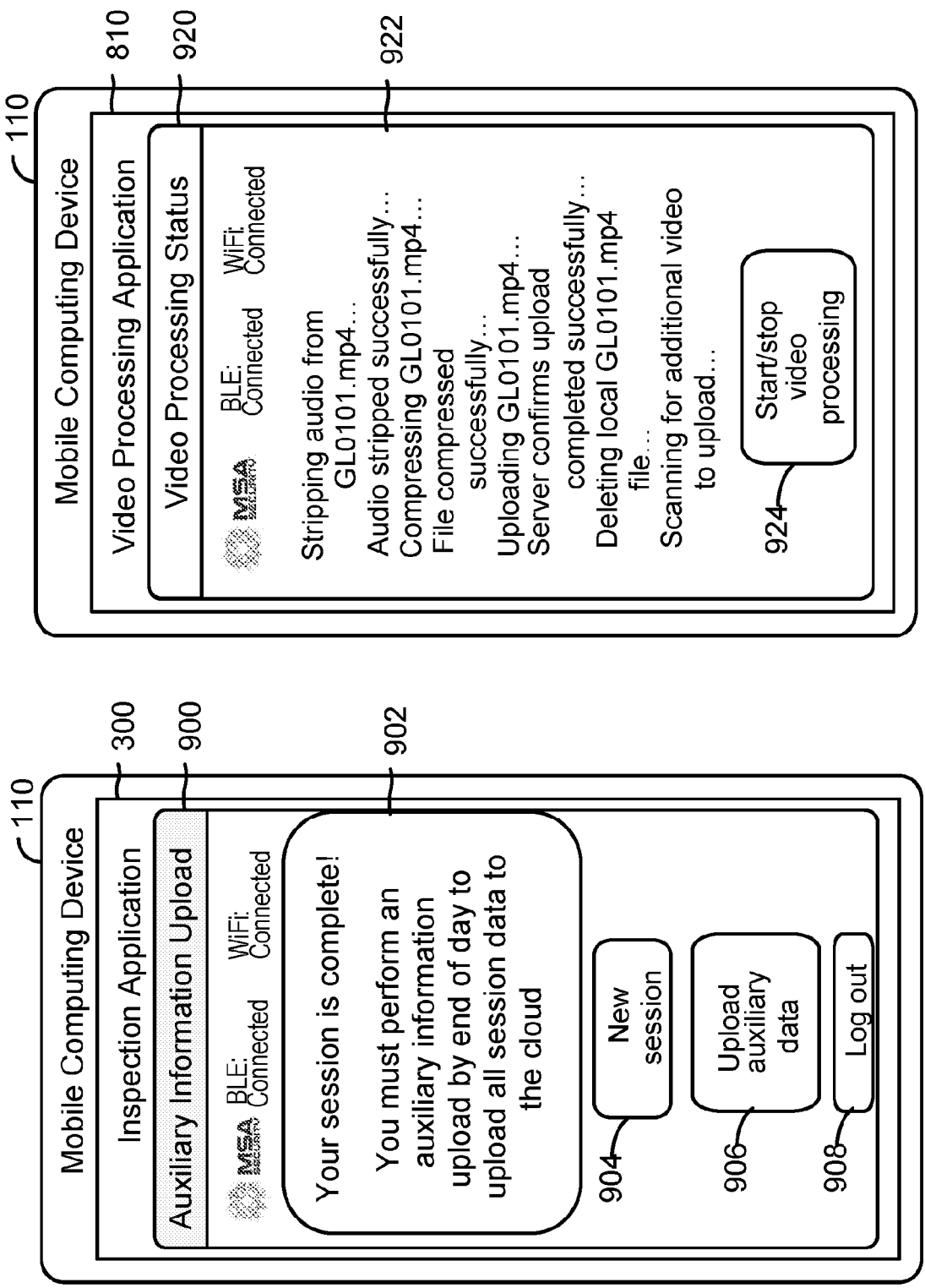
FIG. 9A is a diagram illustrating an example user interface for auxiliary data upload.
FIG. 9B is a diagram illustrating an example user interface for video processing.

FIGS. 9A-9B illustrate examples of user interfaces associated with data uploading to the remote computing system 114. In this example, auxiliary data upload is performed by the inspection application 300, and video processing (including upload) is performed by the video processing application 810, to achieve computational separation. As noted above, in other implementations these operations could be performed by separate processes and/or threads of one application, such as the inspection application 300.

As shown in FIG. 9A, in an auxiliary data upload interface 900, a text popup 902 informs handlers that their screening session has completed, e.g., upon selection of the "continue" user interface element 706. The handler need not immediately upload the auxiliary data—for example, in some implementations the handler does not have cellular data service upon completing a session. Selection of the "new session" user interface element 904 begins a new session (e.g., begins initial checks and obtaining of auxiliary data for the new session as described in reference to FIGS. 3A-3C), without immediately uploading auxiliary data. Selection of user interface element 906 causes auxiliary data for any un-uploaded sessions to be uploaded. For example, if the handler completed a first session, selected user interface element 904 without uploading, and completed a second session, subsequent selection of user interface element 906 would upload the auxiliary data from both the first session and the second session. Selection of user interface element 908 closes the inspection application 300.

As shown in FIG. 9B, in a video processing status user interface 920 of the video processing application 810, a real-time-updating status report 922 informs handlers of video processing operations as they occur. In this example, the video processing application 810 scans for, processes (e.g., audio-strips and compresses), and uploads each video individually. In other implementations, video is processed on a batch basis, e.g., multiple videos can be compressed and then uploaded together. In some implementations, video conversion into a different format also is performed as part of this process. A user interface element 924 allows the handler to start or stop video processing as desired.

Scripts and functions associated with video management, processing, and upload can vary depending on the implementation. Examples of scripts and functions that can be included in the general-purpose application 800 or the video processing application 810 include:

A SyncInterval( ) command takes as argument a time (e.g., in seconds) and sets a starting value of a timer. The timer is constantly decrementing in the background. When the timer reaches zero, a doCompress( ) function is triggered. The timer can reset upon completion of any processing associated with doCompress( ) being triggered.

The doCompress( ) function scans a folder to search for un-compressed video files. If such video files are found, doCompress( ) initiates processing of the video files, e.g., conversion, compression, and/or storage of compressed files in particular folder(s). If there are no videos to compress, doCompress( ) triggers a doUpload( ) function.

The doUpload( ) function scans one or more specific folders in which compressed video files are stored. If any videos are in the folders, doUpload( ) uploads the video files. In some implementations, doUpload( ) deletes compressed video files after upload. In some implementations, doUpload( ) cannot be triggered or cannot run when a video file is undergoing compression.

In some implementations, thread(s), processes(es), and/or application(s) that perform video processing operations are configured to run in the background. This can allow video compression, audio-stripping, and/or video uploading to be performed while a handler continues to perform additional screenings using other thread(s), process(es), and/or application(s), improving screening efficiency.

Figure 10:
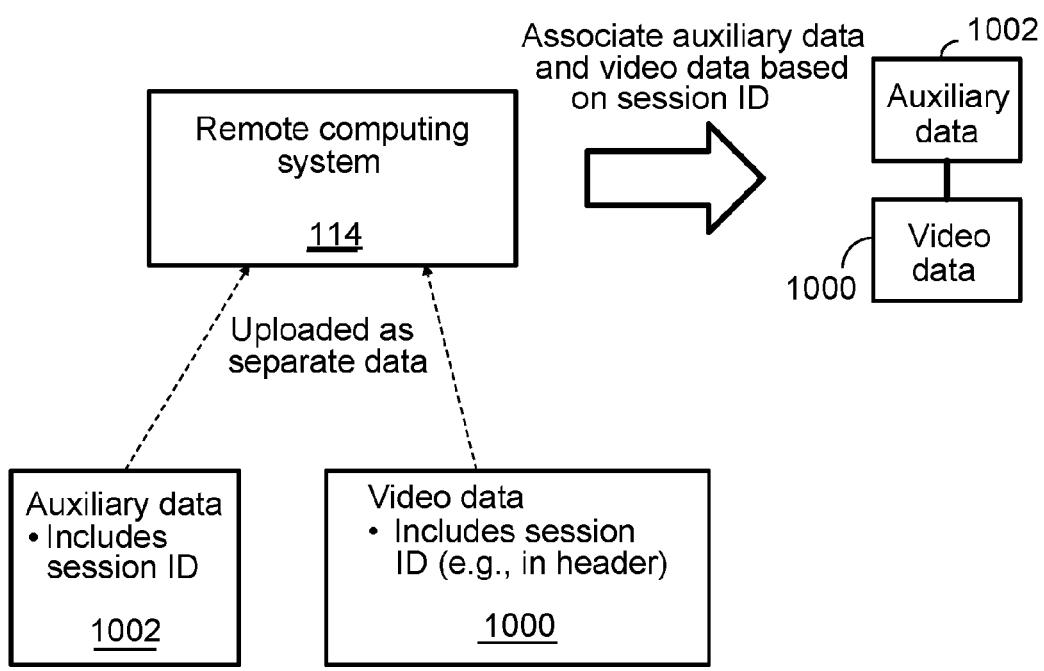
FIG. 10 is a diagram illustrating an example of data upload and association.

As noted above, in some implementations uploaded video is stored at the remote computing system 114 in association with auxiliary data from the session corresponding to the video data. Various data structures can be used to realize this association. For example, as shown in FIG. 10, in some implementations, when video data 1000 (representing one or more videos, and having been compressed and/or audio-stripped by the mobile computing device 110) is uploaded to the remote computing system 114, the video data 1000 includes (e.g., as metadata of the video data 1000), an identifier of the session corresponding to the video data. For example, in some implementations a header of the video data 1000 includes a session ID in a predetermined field of the header. The remote computing system 114 is configured to identify the session ID based on the session ID being stored in the predetermined field, and to associate the video data with auxiliary data 1002 corresponding to the session ID.

Figure 11:
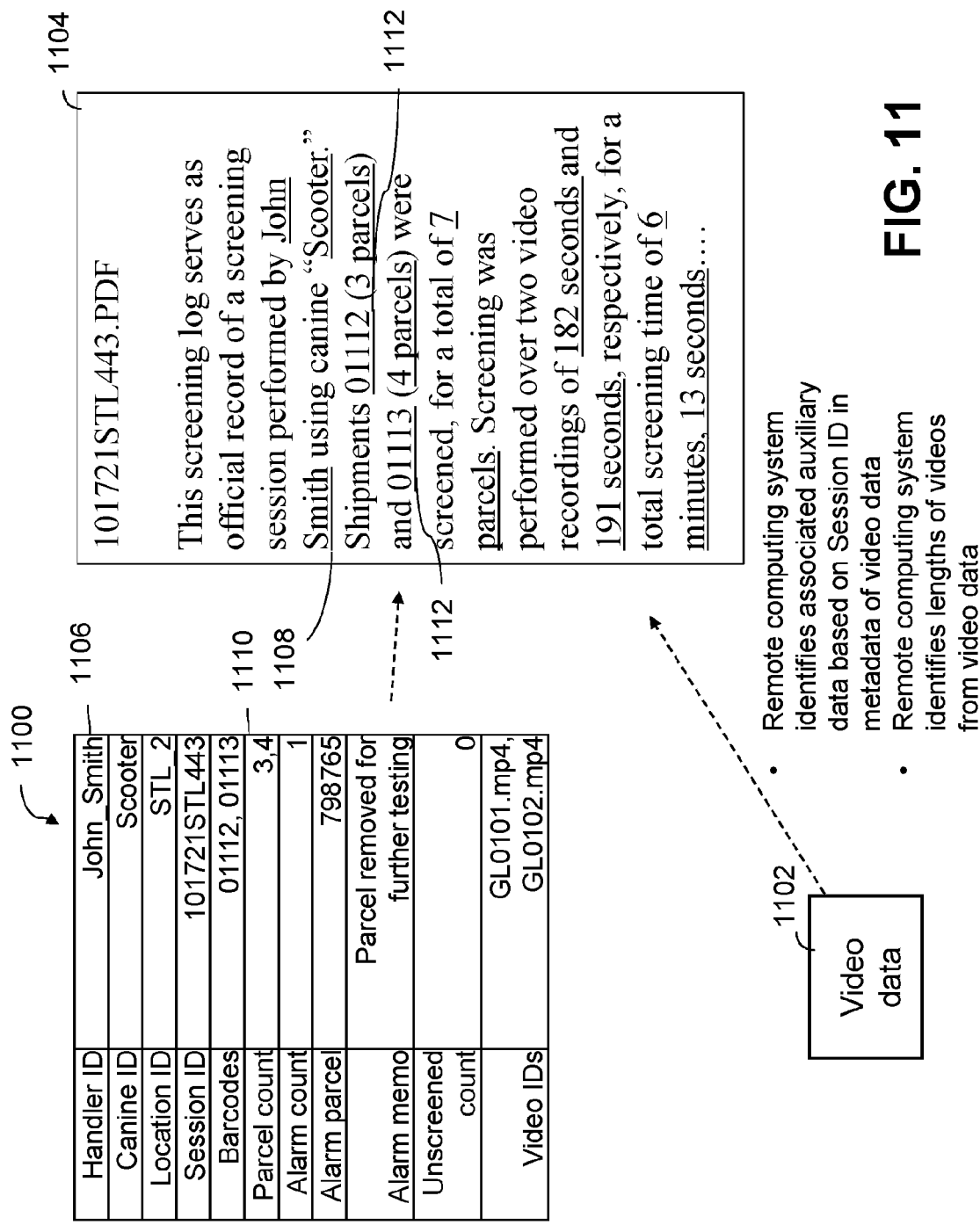
FIG. 11 is a diagram illustrating example inspection log generation.

In some implementations, besides storing auxiliary data and video data (e.g., audio-stripped videos) for later review, one purpose of the remote computing system 114 is to generate documents. For example, the documents can include records of conducted sniff inspections, and the documents can be provided to shipping companies, governmental transportation agencies, and other clients of a sniff inspection firm performing the sniff inspections. As shown in FIG. 11, the remote computing system 114 synthesizes auxiliary data 1100 and, in some implementations, video data 1102 to produce an inspection log 1104, which in some instances takes the form of a PDF document. In some implementations, the inspection log 1104 is a transfer certificate that proves sniff inspections were conducted. In some implementations, the remote computing system 114 is configured with an inspection log template having fields, and information in the auxiliary data 1100 is mapped to correspond fields of the inspection log template. For example, as shown in FIG. 11, the remote computing system 114 stores a mapping between a "Handler ID" field 1106 of the auxiliary data 1100 and a corresponding field 1108 of the inspection log 1104, and populates the corresponding field 1108 with the value "John Smith" of the Handler ID. As another example, the remote computing system 114 stores a mapping between a "Barcodes" field 1110 of the auxiliary data 1100 and corresponding field(s) 1112 of the inspection log 1104, and populates the field(s) 1112 with the respective values "01112" and "01113."

In some implementations, the remote computing system 114 determines at least some data for the inspection log 1104 based on uploaded video data 1102. For example, as shown in FIG. 11, the remote computing system 114 associated the uploaded video data 1102 with the auxiliary data 1100 based on a Session ID included in both sets of data. Also, the remote computing system 114 parses the video data 1102 to determine recording durations of one or more recorded portions of the video data 1102. For example, in some implementations, the remote computing system 114 reads the recording durations from a header of the video data 1102, and/or the remote computing system 114 extracts the recording durations from other elements of the video data 1102. In this example, the recording durations then are inserted into fields 1122 of the inspection log 1104.

In some implementations, the remote computing system 114 is configured to provide screening-related data (e.g., inspection logs, auxiliary data, and/or or video data) to external recipients, e.g., clients of a canine screening service that performed the screening. In combination with the previously-described inspection log generation functionality, this can provide a streamlined client reporting functionality. In some implementations, different formats of the inspection log (e.g., a set of types of fields and/or arrangements of fields in the inspection log) are stored at the remote computing system 114 in association with different clients, the remote computing system 114 generates an inspection log having a format associated with the client for whom the screening session of the inspection log was performed, and remote computing system 114 transmits the generated inspection log to the client, e.g., over the Internet. In some implementations, transmission to the client can be in response to a user instruction to the remote computing system 114. In some implementations, the remote computing system 114 incorporates a time-out functionality in which, if an inspection log is not transmitted to the client within a predetermined period of time (e.g., a time from a generation of the inspection log), the inspection log is automatically transmitted to the client.

In some implementations, users can log into a screening management portal to view uploaded data and/or generated inspection logs. For example, authorized users operating user devices can log into a cloud-based system that includes the remote computing system 114. Using the portal, the users can edit auxiliary data (e.g., to correct errors), view video of completed screenings (without compromising privacy, because the video has been audio-stripped), view and edit inspection logs generated by the remote computing system 114, and/or perform other operations.

Figure 12:
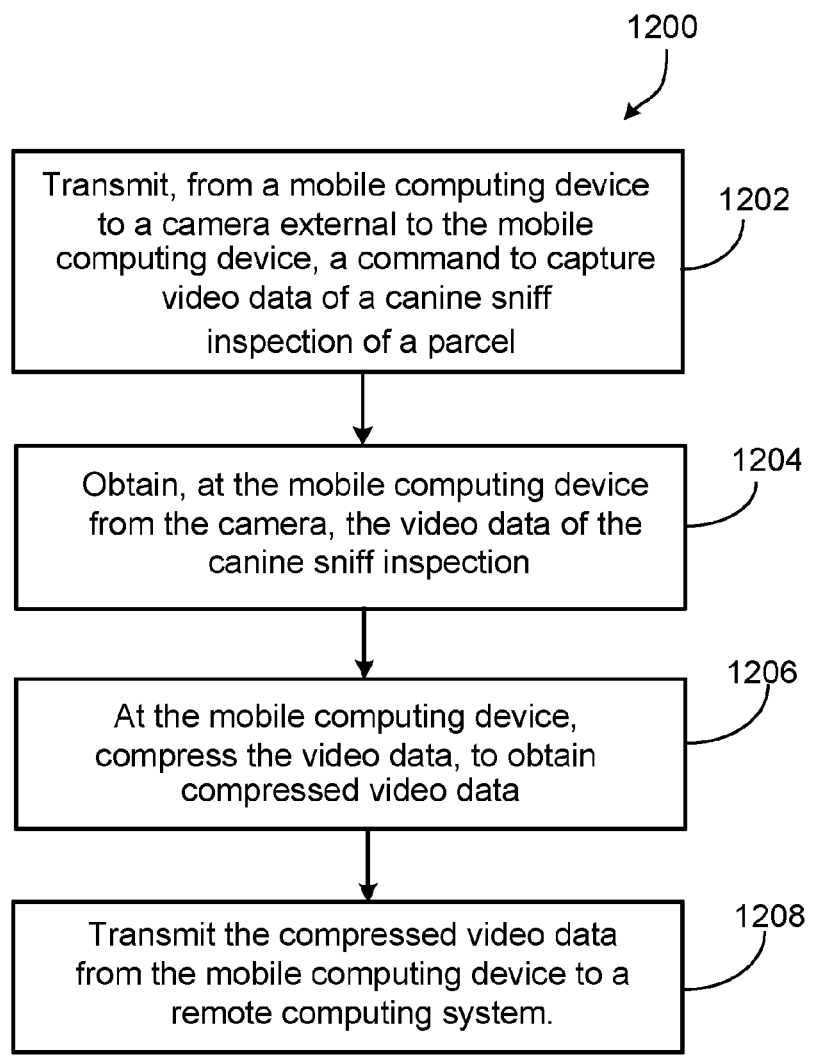
FIG. 12 is a diagram illustrating an example process.

An example of a process 1200 is illustrated in FIG. 12. The process 1200 can be performed by a mobile computing device, such as mobile computing device 110. In some implementations, the process 1200 includes one or more additional elements that can be performed by other component(s), such as by the remote computing system 114 and/or the camera 108.

In the process 1200, a command is transmitted from a mobile computing device to a camera external to the mobile computing device (1202). The command commands the camera to capture video data of a canine sniff inspection of a parcel. The video data of the canine sniff inspection is obtained at the mobile computing device from the camera (1204). The video data is compressed at the mobile computing device, to obtain compressed video data (1206). The compressed video is transmitted from the mobile computing device to a remote computing system (1208).

Accordingly, by joint operation of a mobile computing device, a camera, and a remote computing system, canine sniff inspection data can be efficiently obtained, processed, and transferred.

Various implementations of the systems and techniques described here, such as the camera 108, the mobile computing device 110, and the remote computing system 114, can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable processing system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refer to any computer program product, apparatus and/or device (e.g., magnetic discs, optical disks, memory, Programmable Logic Devices (PLDs)) used to provide machine instructions and/or data to one or more programmable processors, including a machine-readable medium that receives machine instructions.

The systems and techniques described here can be implemented in a computing system that includes a back end component (e.g., as a data server), and/or that includes a middleware component (e.g., an application server), and/or that includes a front end component (e.g., a client computer having a graphical user interface or a Web browser through which a user can interact with an implementation of the systems and techniques described here), and/or any combination of such back end, middleware, or front end components. The components of the system can be interconnected by any form or medium of digital data communication (e.g., a communication network). Examples of communication networks include a local area network ("LAN"), a wide area network ("WAN"), cellular data networks, and the Internet.

The computing system can include clients and servers. A client and server are generally remote from each other and typically interact through a communication network. The relationship of client and server arises by virtue of computer programs running on the respective computers and having a client-server relationship to each other.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by the data processing apparatus, cause the apparatus to perform the operations or actions.

Although a few implementations have been described in detail above, various modifications are possible. Logic flows depicted in the figures do not necessarily require the particular order shown, or sequential order, to achieve desirable results. In addition, other actions may be provided, or actions may be omitted, from the described flows, and other components may be added to, or omitted from, the described systems. Accordingly, other implementations also are within the scope of the claims.

What is claimed is:

1. A computer-implemented method comprising:
    transmitting, from a mobile computing device to a camera external to the mobile computing device, a command to capture video data;
    obtaining, at the mobile computing device from the camera, the video data, wherein the video data comprises video data of a canine sniff inspection of a parcel;
    obtaining, at the mobile computing device, auxiliary data characterizing the canine sniff inspection;
    at the mobile computing device, compressing the video data, to obtain compressed video data;
    transmitting, from the mobile computing device to a remote computing system:
        the compressed video data,
        the auxiliary data, and
        an association between the auxiliary data and the compressed video data; and
    generating, at the remote computing system, an inspection log, wherein generating the inspection log comprises:
        identifying a first plurality of fields in the auxiliary data, the first plurality of fields storing a corresponding plurality of values,
        accessing a stored correspondence between the first plurality of fields in the auxiliary data and a second plurality of fields in the inspection log, and
        based on the stored correspondence, filling the second plurality of fields in the inspection log with corresponding values from the first plurality of fields.

2. The computer-implemented method of claim 1, comprising, at the remote computing system:
    receiving the compressed video data from the mobile computing device;
    stripping audio from the compressed video data, to obtain compressed, audio-stripped video data;
    storing the compressed, audio-stripped video data in a storage of the remote computing system; and
    deleting the compressed video data from the remote computing system.

3. The computer-implemented method of claim 1, wherein the command is transmitted to the camera through a first type of network connection between the mobile computing device and the camera, and
    wherein the video data is obtained at the mobile computing device through a second type of network connection between the mobile computing device and the camera, wherein the first type of network connection is distinct from the second type of network connection.

4. The computer-implemented method of claim 3, wherein the first type of network connection is a Bluetooth connection, and wherein the second type of network connection is a WiFi network connection.

5. The computer-implemented method of claim 4, wherein a WiFi network of the Wifi network connection is generated by the camera.

6. The computer-implemented method of claim 1, wherein transmitting the command and compressing the video data are performed, respectively, in distinct threads running on the mobile computing device.

7. The computer-implemented method of claim 6, wherein the distinct threads run in respective distinct applications on the mobile computing device.

8. The computer-implemented method of claim 1, wherein the auxiliary data comprises at least one of: an identifier of the parcel, an identifier of a handler, or an identifier of a sniffer dog.

9. The computer-implemented method of claim 1, wherein obtaining the auxiliary data comprises:
capturing, by the mobile computing device, an image of a code associated with the parcel; and
extracting, by the mobile computing device, at least some of the auxiliary data from the image of the code.

10. The computer-implemented method of claim 1, comprising:
inserting, by the mobile computing device, into metadata of the compressed video data, an identifier of the auxiliary data.

11. The computer-implemented method of claim 10, wherein inserting the identifier of the auxiliary data comprises inserting the identifier of the auxiliary data into a header of the compressed video data.

12. The computer-implemented method of claim 1, comprising:
during recording of the video data by the camera, receiving, at the mobile computing device, a user input indicating a detection event; and
in response to receiving the user input, including, in the auxiliary data, an indicator of the detection event.

13. The computer-implemented method of claim 1, comprising:
at the remote computing system, parsing the compressed video data to obtain a recording length of the compressed video data; and
including the recording length in the inspection log.

14. The computer-implemented method of claim 1, wherein obtaining the video data comprises obtaining the video data in a first format and in a second format, and wherein the computer-implemented method comprises:
in response to an input by a user, playing, on the mobile computing device, the video data in the first format,
wherein compressing the video data comprises compressing the video data in the second format.

15. The computer-implemented method of claim 14, wherein the first format has a lower resolution than the second format.

16. The computer-implemented method of claim 1, wherein compressing the video data comprises compressing the video data while maintaining at least a specified minimum resolution of the video data.

17. A computer-implemented system, comprising:
one or more processors; and
one or more computer memory devices interoperably coupled with the one or more processors and having tangible, non-transitory, machine-readable media storing one or more instructions that, when executed by the one or more processors, cause the one or more processors to perform operations comprising:
transmitting, from a mobile computing device to a camera external to the mobile computing device, a command to capture video data;
obtaining, at the mobile computing device from the camera, the video data, wherein the video data comprises video data of a canine sniff inspection of a parcel;
obtaining, at the mobile computing device, auxiliary data characterizing the canine sniff inspection;
at the mobile computing device, compressing the video data, to obtain compressed video data; and
transmitting, from the mobile computing device to a remote computing system:
the compressed video data,
the auxiliary data, and
an association between the auxiliary data and the compressed video data; and
generating, at the remote computing system, an inspection log, wherein generating the inspection log comprises:
identifying a first plurality of fields in the auxiliary data, the first plurality of fields storing a corresponding plurality of values,
accessing a stored correspondence between the first plurality of fields in the auxiliary data and a second plurality of fields in the inspection log, and
based on the stored correspondence, filling the second plurality of fields in the inspection log with corresponding values from the first plurality of fields.

18. The computer-implemented system of claim 17, wherein the command is transmitted to the camera through a first type of network connection between the mobile computing device and the camera, and
wherein the video data is obtained at the mobile computing device through a second type of network connection between the mobile computing device and the camera, wherein the first type of network connection is distinct from the second type of network connection.

19. The computer-implemented system of claim 17, wherein transmitting the command and compressing the video data are performed, respectively, in distinct threads running on the mobile computing device.

20. The computer-implemented system of claim 17, wherein the operations comprise, at the remote computing system:
receiving the compressed video data from the mobile computing device;
stripping audio from the compressed video data, to obtain compressed, audio-stripped video data;
storing the compressed, audio-stripped video data in a storage of the remote computing system; and
deleting the compressed video data from the remote computing system.

* * * * *